United States Patent
Wang et al.

(10) Patent No.: US 12,522,733 B2
(45) Date of Patent: Jan. 13, 2026

(54) COATING COMPOSITIONS, METHODS FOR USING THEM AND SYSTEMS THAT INCLUDE THEM

(71) Applicant: PPG Industries Ohio, Inc., Cleveland, OH (US)

(72) Inventors: Chao Wang, Gibsonia, PA (US); Randy E. Daughenbaugh, Monroeville, PA (US); Ronald J. Kralic, Jr., Beaver Falls, PA (US); Brian Kirk Rearick, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 18/682,262

(22) PCT Filed: Aug. 3, 2022

(86) PCT No.: PCT/US2022/074449
§ 371 (c)(1),
(2) Date: Feb. 8, 2024

(87) PCT Pub. No.: WO2023/019073
PCT Pub. Date: Feb. 16, 2023

(65) Prior Publication Data
US 2024/0352273 A1 Oct. 24, 2024

Related U.S. Application Data

(60) Provisional application No. 63/274,167, filed on Nov. 1, 2021, provisional application No. 63/232,761, filed on Aug. 13, 2021.

(51) Int. Cl.
| | |
|---|---|
| *C09D 5/00* | (2006.01) |
| *C09D 7/20* | (2018.01) |
| *C09D 7/40* | (2018.01) |
| *C09D 133/14* | (2006.01) |
| *C09D 161/28* | (2006.01) |

(52) U.S. Cl.
CPC ............... *C09D 5/00* (2013.01); *C09D 7/20* (2018.01); *C09D 7/70* (2018.01); *C09D 133/14* (2013.01); *C09D 161/28* (2013.01)

(58) Field of Classification Search
CPC .............. C11D 17/003; C11D 17/043; C09K 2003/1071; C09D 5/04; C09D 5/00; C09D 7/70; C04B 2111/0012; C04B 2103/0085
See application file for complete search history.

(56) References Cited

U.S. PATENT DOCUMENTS

| | | |
|---|---|---|
| 7,001,952 B2 | 2/2006 | Faler et al. |
| 8,207,268 B2 | 6/2012 | Brinkhuis et al. |
| 8,722,835 B2 | 5/2014 | Mowrer |
| 8,846,827 B2 | 9/2014 | Mowrer |
| 2002/0082183 A1* | 6/2002 | Christensen, Jr. ........ C11D 3/14 510/392 |
| 2006/0159870 A1 | 7/2006 | Lenges et al. |
| 2008/0317963 A1* | 12/2008 | Barcock ................. B05D 1/305 427/420 |
| 2011/0257279 A1* | 10/2011 | Wouters .............. B29B 17/0206 521/40 |
| 2015/0093512 A1 | 4/2015 | Brunner et al. |
| 2015/0376553 A1* | 12/2015 | Broeckx ............ C11D 17/0013 510/513 |
| 2016/0053122 A1 | 2/2016 | Hill et al. |
| 2019/0054681 A1* | 2/2019 | Fenn .................... C08G 18/325 |
| 2019/0211213 A1* | 7/2019 | Lutkenhaus ........... C08K 3/346 |
| 2020/0291261 A1 | 9/2020 | Moore et al. |
| 2020/0360963 A1 | 11/2020 | Moore et al. |
| 2020/0369900 A1 | 11/2020 | Moore et al. |
| 2020/0392365 A1 | 12/2020 | Moyano |
| 2021/0032494 A1 | 2/2021 | Moore et al. |
| 2021/0170435 A1 | 6/2021 | Moore et al. |
| 2021/0170440 A1 | 6/2021 | Moore et al. |
| 2021/0170444 A1 | 6/2021 | Moore et al. |
| 2021/0170776 A1 | 6/2021 | Moore et al. |
| 2021/0171795 A1 | 6/2021 | Moore et al. |
| 2021/0171796 A1 | 6/2021 | Moore et al. |
| 2021/0187542 A1 | 6/2021 | Moore et al. |
| 2021/0189150 A1 | 6/2021 | Moore et al. |
| 2021/0189172 A1 | 6/2021 | Moore et al. |
| 2022/0002581 A1 | 1/2022 | Moore et al. |
| 2022/0220335 A1 | 7/2022 | Reil et al. |

FOREIGN PATENT DOCUMENTS

| | | |
|---|---|---|
| CN | 114222794 A | 3/2022 |
| EP | 4074782 A1 | 10/2022 |
| WO | 2020232011 A1 | 11/2020 |

OTHER PUBLICATIONS

Allnex: "Setalux 61767 VX-60", May 29, 2020, pp. 1-1, XP055980139.
International Search Report and Written Opinion received for PCT Application Serial No. PCT/US2022/074449 dated Nov. 24, 2022, 13 pages.

\* cited by examiner

*Primary Examiner* — Sophie Hon

(57) ABSTRACT

Coating compositions that include organic solvents and have a shear thinning rheological profile. At high shear rates the coating compositions have a viscosity low enough to flow through an opening in a high efficiency applicator and be applied to a surface. Under low or no shear, the coating compositions, when applied to a vertical surface, exhibits minimal or no sag.

5 Claims, No Drawings

COATING COMPOSITIONS, METHODS FOR USING THEM AND SYSTEMS THAT INCLUDE THEM

CROSS-REFERENCE TO RELATED APPLICATIONS

This application is a U.S. national stage filing under 35 U.S.C. § 371 of International Application No. PCT/US2022/074449, filed on Aug. 3, 2022, which claims the benefit of priority of U.S. Provisional Applications 63/232,761 filed Aug. 13, 2021 and 63/274,167, filed Nov. 1, 2021, under 35 U.S.C. 119, titled "Coating compositions, methods for using them and systems that include them" which are both incorporated herein by reference.

FIELD

This disclosure generally relates to coating compositions for application to a substrate, methods of forming coating layers and systems therefor.

BACKGROUND

Coating compositions can be applied to a wide variety of substrates to provide color and other visual effects as well as various designs and patterns. For example, coatings can be applied to automotive substrates to provide two or more different colors on different portions of the substrate. To form different designs and patterns, masking materials are conventionally placed over different portions of the substrate and multiple applications of different coating compositions are applied over the substrate.

SUMMARY

This disclosure describes coating compositions that include organic solvents and have a shear thinning rheological profile. At high shear rates the coating compositions have a viscosity low enough to flow through an opening in a high efficiency applicator and be applied to a surface. Under low or no shear, the coating compositions, when applied to a vertical surface, exhibit minimal or no sag.

DETAILED DESCRIPTION

Unless otherwise indicated, conditions of temperature and pressure are ambient temperature (22° C.), a relative humidity of 45%, and standard pressure of 101.3 kPa (1 atm).

Unless otherwise indicated, any term containing parentheses refers, alternatively, to the whole term as if parentheses were present and the term without them, and combinations of each alternative. Thus, as used herein the term, "(meth)acrylate" and like terms is intended to include acrylates, methacrylates and their mixtures.

It is to be understood that this disclosure may assume various alternative variations and step sequences, except where expressly specified to the contrary. Accordingly, unless indicated to the contrary, the numerical parameters set forth in the following specification and attached claims are approximations that can vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

All ranges are inclusive and combinable. For example, the term "a range of from 0.06 to 0.25 wt. %, or from 0.06 to 0.08 wt. %" would include each of from 0.06 to 0.25 wt. %, from 0.06 to 0.08 wt. %, and from 0.08 to 0.25 wt. %. Further, when ranges are given, any endpoints of those ranges and/or numbers recited within those ranges can be combined within the scope of the present disclosure.

As used herein, unless otherwise expressly specified, all numbers such as those expressing values, ranges, amounts or percentages can be read as if prefaced by the word "about", even if the term does not expressly appear. Unless otherwise stated, plural encompasses singular and vice versa. As used herein, the term "including" and like terms means "including but not limited to". Similarly, as used herein, the terms "on", "applied on/over", "formed on/over", "deposited on/over", "overlay" and "provided on/over" mean formed, overlay, deposited, or provided on but not necessarily in contact with the surface. For example, a coating layer "formed over" a substrate does not preclude the presence of one or more other coating layers of the same or different composition located between the formed coating layer and the substrate.

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the disclosure.

As used herein, the term "actinic radiation" refers to electromagnetic radiation that can initiate chemical reactions. Actinic radiation includes, but is not limited to, visible light, ultraviolet (UV) light, infrared (IR), X-ray, and gamma radiation.

As used herein, the term "adhesion promoter" refers to any material that, when included in the composition, enhances the adhesion of the coating composition to a substrate.

As used herein, the term "alkoxy-functional silicone" and like terms refers to silicones that include only alkoxy functional groups, —OR, wherein R can be an alkyl group or an aryl group.

As used herein, the terms "a" and "an" shall be construed to include "at least one" and "one or more".

As used herein, the term "applicator" refers to any device capable of applying a coating composition to a substrate and can include without limitation a roller, a brush, a spray tip in fluid communication with a nozzle and a high efficiency applicator.

As used herein, the term "ASTM" refers to publications of ASTM International, West Conshohocken, PA.

As used herein, the term "basecoat" refers to a coating layer that is applied onto a primer, another basecoat layer;

and/or directly onto a substrate, optionally including components (such as colorants) that impact the color and/or provide other visual impact.

As used herein the term "binder" refers to a compound or mixture of compounds used to bind the input materials, including pigments, fillers etc., if present, in the coating composition and provide adhesion of the coating film to the underlying surface as a continuous film.

As used herein the term "clearcoat" refers to a coating layer that is at least substantially transparent or fully transparent and may not include a colorant. The term "substantially transparent" refers to a coating, wherein a surface beyond the coating layer is at least partially visible to the naked eye when viewed through the coating. The term "fully transparent" refers to a coating, wherein a surface beyond the coating layer is completely visible to the naked eye when viewed through the coating. The clearcoat can be substantially free of a pigment. Substantially free of a pigment can refer to a "tinted clearcoat", which can be a coating composition that includes less than 3 weight % of pigment, based on the total solids, such as less than 2 weight %, less than 1 weight %, or 0 weight %.

As used herein, the term "coating" refers to the finished product resulting from applying one or more coating compositions to a substrate and forming the coating, as a nonlimiting example by curing. A primer layer, basecoat or color coat layer and clearcoat layer can comprise part of a coating. As used herein, the term "coating layer" is used to refer to the result of applying one or more coating compositions on a substrate in one or more applications of such one or more coating compositions. As a nonlimiting example, a single coating layer, referred to as a "color coat" or "topcoat" can be used to provide the function of both a basecoat and a clearcoat and can comprise the result of two or more applications of a color coat coating composition.

As used herein, the term "colorant" refers to any substance that imparts color and/or other opacity and/or other visual effect to a coating composition and can include, without limitation, dyes and pigments.

As used herein, the term "droplets" refers to drops of coating from a precision applicator that are applied far enough apart to reduce the material volume applied, yet close enough to flow together and provide conformal coating coverage.

As used herein, the term "continuous jet" refers to a continuous coating stream from a precision applicator applied to a substrate to provide a knife edge line where the applied coating ends.

As used herein, the term "crosslink" refers to a bond or a short sequence of bonds that links one polymer chain to another. "Highly crosslinked" refers to a situation where the number of crosslinks renders the polymer swellable, to some extent, but insoluble in a solvent or water.

As used herein, the term "crosslinking agent" refers to a molecule or polymer containing functional groups that are reactive with the crosslinking-functional group of the polymers and/or resins in the coating composition.

As used herein, the term "crosslinking-functional group" refers to functional groups that are positioned in the backbone of a polymer, often, in a group pendant from the backbone of the polymer, terminally positioned on the backbone of the polymer, or combinations thereof, wherein such functional groups are capable of reacting with other crosslinking-functional groups or separate crosslinking agents during curing to produce a crosslinked coating.

As used herein, the terms "curable", "cure", and the like, as used in connection with a coating composition, refer to at least a portion of the components that make up the coating composition are polymerizable and/or crosslinkable when, as a nonlimiting example, exposed to higher temperatures or ultraviolet radiation.

As used herein the terms "drop" and "droplet" refer to a column of liquid, bounded completely by free surfaces.

As used herein, "drop on demand" refers to a precision applicator that controls the volume of a single drop and only dispenses such a drop when indicated to do so.

As used herein the terms "dry" or "drying" refers to the removal of volatile compounds from a film, coating layer or an applied coating.

As used herein the term "dye" refers to a colored substance, in many cases an organic compound, that can chemically bond to a substrate or another component in a coating composition.

As used herein, the term "film-forming" materials refers to film-forming constituents of a coating composition and can include polymers, resins, crosslinking materials or any combination thereof that are film-forming constituents of the coating composition.

Film-forming materials can be dried or cured.

As used herein, the term "flow rate" refers to the volume of a coating composition leaving an applicator per a unit of time, as a nonlimiting example $cm^3$/minute.

As used herein, the term "fully transparent" refers to a coating, where a surface beyond the coating layer is completely visible to the naked eye when viewed through the coating.

As used herein, "high efficiency applicator" refers to precision application devices that can enable a coating composition to be applied over at least a portion of a substrate without overspray, as a nonlimiting example, greater than 85% Transfer Efficiency.

Unless otherwise indicated, as used herein, the term "molecular weight" refers to a weight average molecular weight as determined by gel permeation chromatography (GPC) using appropriate polystyrene standards. If a number average molecular weight is specified, the weight is determined in the same GPC manner, while calculating a number average from the thus obtained polymer molecular weight distribution data.

As used herein the terms "multi component", "multi-K" and "multi-pack" refers to a coating composition that includes a first component that contains crosslinkable resins, a second component that contains crosslinking agents and additional components that may or may not contain, crosslinkable resins or crosslinking agents, where the components are maintained separately until just prior to use. The crosslinkable resins and crosslinking agents are capable of reacting when combined to form a thermoset composition. When the multi component coating composition does not include additional components, it is a two component coating composition.

As used herein, the term "nozzle" refers to a component of an applicator having an opening through which a coating composition flows, is ejected or jetted and, unless otherwise indicated, the term "nozzle" is used interchangeably with any of a valve jet, or piezo-electric, thermal, acoustic, or ultrasonic actuated valve jet or nozzle.

As used herein, "overspray" refers to a portion of a coating composition that does not land within a target area.

As used herein the terms "one component", "1-K" and "1-pack" refer to a coating composition where all of the coating components are maintained in the same package after manufacture, during shipping and storage. As a nonlimiting example, a coating composition is considered a 1-K coating composition even if solvent(s) are added to the 1-K composition to lower the viscosity or solids thereof.

As used herein, the term "organic solvent" refers to carbon-based substances capable of dissolving or dispersing other substances.

As used herein, the term "overlap" refers to the amount of a coating composition in a path width that is applied over the coating composition of a previous path width.

As used herein, the term "path width" refers to the distance perpendicular to the direction of movement of an applicator where a coating composition is applied to a substrate.

As used herein, the term "pigment" refers to an organic or inorganic material or a combination thereof, that can be a colored material, that is completely or nearly insoluble in a solvent, and can also be functional, a nonlimiting example being anticorrosion pigments or effect pigments, nonlimiting examples including mica and aluminum.

As used herein the prefix "poly" refers to two or more. As a nonlimiting example, a polyisocyanate refers to a compound that includes two or more isocyanate groups and a polyol refers to a compound that includes two or more hydroxyl groups.

As used herein, the term "polyisocyanate" refers to blocked (or capped) polyisocyanates as well as unblocked polyisocyanates.

As used herein, the term "polymer" includes homopolymers (formed from one monomer) and copolymers that are formed from two or more different monomer reactants or that comprise two or more distinct repeat units. Further, the term "polymer" includes prepolymers, and oligomers.

As used herein, the term "primer coat" refers to an undercoating layer that can be applied onto a substrate in order to prepare the surface for application of a protective or decorative coating composition.

As used herein the term "rheological modifier" refers to materials that alter the rheology or flow properties of a fluid composition to which it is added and can include, but are not limited to natural gums, synthetic resins, organoclays, hydrogenated castor oils, fumed silicas, polyamides, associative thickeners, overbased sulfonates (as a nonlimiting example, colloidal calcium sulfonate dispersed in an oil, with excess sulfonate acting as the surfactant), inorganic crystals, non-aqueous microgels and polyurea compounds that are not soluble in organic solvents.

As used herein the term "sag" refers to the downward movement of a coating composition that can appear after application of the coating composition to a substrate and before the coating composition sets, cures and/or dries, nonlimiting examples include a dropping line, sagging curtains, tearing drops, or other defects and variations in a coating that causes the coating to be un-smooth as tested according to ASTM D4400 (2018). Sag can be measured in mm using a ruler. The drip or wing defect of a coating can be visible underneath a panel hole. ASTM D4400 suggests that the sag limit is 1.6 mm (distance between drawdown lines). As used herein, "no sag" refers to a situation where there is no visible drip or wing defect, "minimal sag" refers to a situation where there is no more than 5 mm drip or wing defect between drawdown lines.

As used herein the term "shear strain" refers to the deformation or flow of a coating composition in response to an applied shear stress.

As used herein the term "shear stress" refers to pressure applied to a surface of a coating composition.

As used herein the term "shear thinning" refers to the non-Newtonian behavior of fluids whose viscosity decreases under increasing shear stress.

As used herein, the term "stream" refers to a body of flowing liquid, in many cases a flowing coating composition.

As used herein, the term "silicone" and like terms refers to polysiloxane polymers, which are based on a structure that includes alternate silicon and oxygen atoms. As used herein, "silicone" and "siloxane" are used interchangeably.

As used herein, the term "silanol-functional silicone" and like terms refers to silicones that include silanol functional groups, —SiOH.

As used herein, the term "substrate" refers to an article surface to be coated and can refer to a coating layer disposed on an article that is also considered a substrate.

As used herein, the term "target area" means a portion of the surface area of any substrate that is to be coated in applying a coating composition, such as a first, a second or a third coating composition. The target area will often not include the entire surface area of a given substrate. The term "non-target area" means the remainder of the surface area of the substrate and includes all areas beyond the substrate. In applying multiple coating compositions, for each application of one coating composition, the target area and non-target areas can differ.

As used herein, the term "thermosetting" means a polymer or resin that has functional groups that react with functional groups in a crosslinking agent or another polymer or molecule to form a network material, irreversibly transforming the "soft" polymer to a more rigid form. Thermosetting in many cases refers to resins that "set" irreversibly upon curing or crosslinking, wherein the polymer chains of the resins are joined together by covalent bonds. Once cured or crosslinked, a thermosetting resin will not melt upon the application of heat and is insoluble in most organic solvents.

As used herein the term "thermoplastic" refers to polymers and resins that are not joined by covalent bonds and, thereby, can undergo liquid flow upon heating and can be soluble in certain solvents.

As used herein the term "tip speed" refers to the speed at which an applicator traverses across the surface of a substrate.

As used herein, the term "total solids" or "solids" or "solids content" refers to the solids content as determined in accordance with ASTM D2369 (2015).

As used herein, the term "use conditions" means all temperatures and pressures, including ambient pressures, such as 101.3 kPa (1 atm), and temperatures at which any coating composition is used, stored or applied, and can include temperatures as low as −10° C. and as high as 140° C.

As used herein, the term "transfer efficiency" refers to the weight percent of a coating composition that is applied to a substrate as compared to the weight of the coating composition leaving an applicator according to ASTM D5286-20.

As used herein, the term "topcoat" refers to an uppermost coating layer that is applied over another coating layer such as a basecoat to provide a protective and/or decorative layer.

As used herein the terms "two component", "2-K" and "2-pack" refers to a coating composition that includes a first component that contains a crosslinkable resins and a second component that contains crosslinking agents, where the first and the second components are maintained separately prior to use. The crosslinkable resins and crosslinking agents are capable of reacting when combined to form a thermoset composition.

As used herein, the term "vehicle" is used in its broadest sense and includes all types of vehicles, such as but not limited to cars, mini vans, SUVs (sports utility vehicle), trucks, semi trucks; tractors, buses, vans, golf carts, motorcycles, bicycles, railroad cars, trailers, ATVs (all terrain vehicle); pickup trucks; heavy duty movers, such as, bulldozers, mobile cranes and earth movers; aircraft; boats; ships; and other modes of transport.

As used herein, unless otherwise stated, the term "viscosity" refers to a value determined at 25° C. and ambient pressure and reflects a fluid's resistance to flow when subjected to a shear stress and/or a shear strain.

As used herein, the term "volatile" refers to materials that are readily vaporizable under ambient conditions.

As used herein, the phrase "wt. %" refers to weight percent.

This disclosure describes coating compositions that include organic solvents. The coating composition has a shear thinning rheological profile, in particular, at high shear rates (as a nonlimiting example, 1000 $s^{-1}$) the coating composition has a viscosity low enough to flow through an opening in a high efficiency applicator and be applied to a surface while under low or no shear (as a nonlimiting example, 0.1 $s^{-1}$), the coating composition, when applied to a vertical surface, exhibits minimal or no sag.

The coating compositions described herein include non-volatile and volatile components. The amounts of nonvolatile components are often reflected in the measurement of total solids in the coating composition. The volatile components make up the difference between the original weight of material and the weight after total solids determination of the coating composition (total solids as determined in accordance with ASTM D2369 (2015).

The amount of the volatile components in the coating composition can be at least 5 wt. %, such as at least 10 wt. %, at least 15 wt. %, at least 20 wt. %, at least 25 wt. %, at least 30 wt. %, at least 35 wt. % and at least 40 wt. % and can be up to 90 wt. %, such as up to 85 wt. %, up to 80 wt. %, up to 75 wt. % and up to 70 wt. % and can be from 5 wt. % to 90 wt. %, such as 10 wt. % to 90 wt. %, 10 wt. % to 85 wt. %, 10 wt. % to 80 wt. %, 10 wt. % to 75 wt. %, 10 wt. % to 70 wt. %, 20 wt. % to 90 wt. %, 20 wt. % to 85 wt. %, 20 wt. % to 80 wt. %, 20 wt. % to 75 wt. %, 20 wt. % to 70 wt. %, 30 wt. % to 90 wt. %, 30 wt. % to 85 wt. %, 30 wt. % to 80 wt. %, 30 wt. % to 75 wt. %, 30 wt. % to 70 wt. %, 40 wt. % to 90 wt. %, 40 wt. % to 85 wt. %, 40 wt. % to 80 wt. %, 40 wt. % to 75 wt. %, and 40 wt. % to 70 wt. %, based on the weight of the coating composition. When the amount of volatile components is too high or too low, the coating composition may not have a desired rheological profile, separate streams may not merge as desired and/or the coating composition may sag unacceptably on vertical substrates. The amount of volatile components in the coating composition can be any value or range between (and include) any of the values recited above.

The amount of organic solvent in the volatile components in the coating composition can be at least 70 wt. %, such as at least 72.5 wt. %, and at least 75 wt. % and can be up to 100 wt. %, such as up to 95 wt. %, up to 92.5 wt. %, and up to 90 wt. %, and from 70 wt. % to 100 wt. %, such as 70 wt. % to 95 wt. %, 70 wt. % to 90 wt. %, 72.5 wt. % to 100 wt. %, 72.5 wt. % to 95 wt. %, 72.5 wt. % to 90 wt. %, 75 wt. % to 100 wt. %, 75 wt. % to 95 wt. %, 75 wt. % to and 90 wt. %, based on the weight of the volatile components in the coating composition. When the amount of organic solvent in the volatile components is too high or too low, the coating composition may not have a desired rheological profile, separate streams may not merge as desired and/or the coating composition may not dry or cure as desired. The amount of organic solvent in the volatile components in the coating composition can be any value or range between (and include) any of the values recited above.

The amount of organic solvent in the coating composition can be at least 5 wt. %, such as at least 10 wt. %, at least 15 wt. %, at least 20 wt. %, at least 25 wt. %, at least 30 wt. %, at least 35 wt. % and at least 40 wt. % and can be up to 90 wt. %, such as up to 85 wt. %, up to 80 wt. %, up to 75 wt. % and in up to 70 wt. %, and from 5 wt. % to 90 wt. %, such as 5 wt. % to 85 wt. %, 5 wt. % to 80 wt. %, 5 wt. % to 75 wt. %, 5 wt. % to 70 wt. %, 10 wt. % to 90 wt. %, 10 wt. % to 85 wt. %, 10 wt. % to 80 wt. %, 10 wt. % to 75 wt. %, 10 wt. % to 70 wt. %, 20 wt. % to 90 wt. %, 20 wt. % to 85 wt. %, 20 wt. % to 80 wt. %, 20 wt. % to 75 wt. %, 20 wt. % to 70 wt. %, 30 wt. % to 90 wt. %, 30 wt. % to 85 wt. %, 30 wt. % to 80 wt. %, 30 wt. % to 75 wt. %, 30 wt. % to 70 wt. %, 40 wt. % to 90 wt. %, 40 wt. % to 85 wt. %, 40 wt. % to 80 wt. %, 40 wt. % to 75 wt. %, and 40 wt. % to 70 wt. %, based on the weight of the coating composition. When the amount of organic solvent is too high or too low, the coating composition may not have a desired rheological profile, separate streams may not merge as desired and/or the coating composition may sag unacceptably on vertical substrates. The amount of organic solvent in the coating composition can be any value or range between (and include) any of the values recited above.

The coating compositions described herein can be solventborne compositions. As a nonlimiting example, the organic solvent can dissolve or disperse the film forming materials and optionally other ingredients of the coating composition and can be selected to have sufficient volatility to evaporate from the coating composition during the curing and/or drying process. Nonlimiting examples of suitable organic solvents include aliphatic hydrocarbons such as mineral spirits and high flash point VM&P naphtha; aromatic hydrocarbons such as benzene, toluene, xylene and solvent naphtha 100, 150, 200 and the like; alcohols, for example, ethanol, n-propanol, isopropanol, n-butanol and the like; ketones such as acetone, cyclohexanone, methyl isobutyl ketone, methyl ethyl ketone, diisobutyl ketone and the like; esters such as ethyl acetate, n-butyl acetate, n-hexyl acetate, pentyl propionate, and the like; glycols such as butyl glycol, glycol ethers such as methoxypropanol and ethylene glycol monomethyl ether, monoethyl, monobutyl and monohexyl ethers of ethylene glycol and the like. Mixtures of various organic solvents can also be used.

The amount of total solids in the coating composition can be at least 10 wt. %, such as at least 15 wt. %, at least 20 wt. %, at least 25 wt. % and at least 30 wt. % and can be up to 95 wt. %, such as up to 90 wt. %, up to 85 wt. %, up to 80 wt. %, up to 75 wt. %, up to 70 wt. % and up to 60 wt. %, and from 10 wt. % to 95 wt. %, such as 10 wt. % to 90 wt. %, 10 wt. % to 80 wt. %, 10 wt. % to 75 wt. %, 10 wt. % to 70 wt. %, 15 wt. % to 95 wt. %, 15 wt. % to 90 wt. %, 15 wt. % to 80 wt. %, 15 wt. % to 75 wt. %, 15 wt. % to 70 wt. %, 20 wt. % to 100 wt. %, 20 wt. % to 90 wt. %, 20 wt. % to 80 wt. %, 20 wt. % to 75 wt. %, 20 wt. % to 70 wt. %, 25 wt. % to 95 wt. %, 25 wt. % to 90 wt. %, 25 wt. % to 80 wt. %, 25 wt. % to 75 wt. %, 25 wt. % to 70 wt. %, 30 wt. % to 100 wt. %, 30 wt. % to 90 wt. %, 30 wt. % to 80 wt. %, 30 wt. % to 75 wt. %, and 30 wt. % to 70 wt. %, based on the weight of the coating composition. When the amount of total solids is too high or too low, the coating composition may not have a desired rheological profile, separate streams may not merge as desired and/or the coating composition may sag unacceptably on vertical substrates. The amount of total solids in the coating composition can be any value or range between (and include) any of the values recited above.

The coating composition can a have a "low solids content". As such the amount of total solids in the coating composition can be at least 5 wt. %, such as at least 8 wt. %, and at least 10 wt. % and can be up to 25 wt. %, such as up to 20 wt. %, up to 15 wt. %, and up to 12 wt. % and from 5 wt. % to 25 wt. %, 5 wt. % to 20 wt. %, 5 wt. % to 15 wt. %, 5 wt. % to 12 wt. %, 8 wt. % to 25 wt. %, 8 wt. % to 20 wt. %, 8 wt. % to 15 wt. %, 8 wt. % to 12 wt. %, 10 wt. % to 25 wt. %, 10 wt. % to 20 wt. %, 10 wt. % to 15 wt. %, and 10 wt. % to 12 wt. %, based on the weight of the coating composition. The amount of total solids in the low solids content coating composition can be any value or range between (and include) any of the values recited above.

As a nonlimiting example, the coating composition can have a viscosity measured at $0.1$ $s^{-1}$ (a low shear rate) and 25° C. that can be at least 1,000 cps, such as at least 2,000 cps, at least 3,000 cps, and at least 4,000 cps and can be up to 30,000 cps, such as up to 25,000 cps, up to 20,000 cps, and up to 15,000 cps, and can be from 1,000 cps to 30,000 cps, such as 1,000 cps to 25,000 cps, 1,000 cps to 20,000 cps, 1,000 cps to 15,000 cps, 2,000 cps to 30,000 cps, 2,000 cps to 20,000 cps, 2,000 cps to 15,000 cps, 3,000 cps to 30,000 cps, 3,000 cps to 25,000 cps, 3,000 cps to 20,000 cps, 3,000 cps to 15,000 cps, 4,000 cps to 30,000 cps, 4,000 cps to 25,000 cps, 4,000 cps to 20,000 cps, and 4,000 cps to 15,000 cps, measured at 25° C. using an Anton Paar MCR 301 rheometer with a Double Gap Cylinder equipped with a DG26.7 measuring system. If the viscosity measured at 0.1 $s^{-1}$ of the coating composition is too high or too low, it may not properly flow through an applicator, separate streams may not merge as desired and/or the coating composition may sag unacceptably on vertical substrates. The viscosity measured at 0.1 $s^{-1}$ of the coating composition can be any value or range between (and include) any of the values recited above.

As a nonlimiting example, the coating composition can have a viscosity measured at 1000 $s^{-1}$ (a high shear rate, unless otherwise indicated, high shear rate refers to 1000 $s^{-1}$) at 25° C. that can be at least 25 cps, such as at least 35 cps, at least 40 cps, at least 45 cps, at least 60 cps, at least 63 cps and at least 68 cps and can be up to 150 cps, such as up to 140 cps, 130 cps, and up to 125 cps and can be from 25 cps to 150 cps, such as 25 cps to 140 cps, 25 cps to 130 cps, 25 cps to 125 cps, 35 cps to 150 cps, 35 cps to 140 cps, 35 cps to 130 cps, 35 cps to 125 cps, 40 cps to 150 cps, 40 cps to 140 cps, 40 cps to 130 cps, 40 cps to 125 cps, 60 cps to 150 cps, 60 cps to 140 cps, 60 cps to 130 cps, and 60 cps to 125 cps, measured at 1000 $s^{-1}$, measured using an Anton Paar MCR 301 rheometer with a Double Gap Cylinder equipped with a DG26.7 measuring system. If the viscosity measured at 1000 $s^{-1}$ of the coating composition is too high or too low, it may not properly flow through an applicator, separate streams may not merge as desired and/or the coating composition may sag unacceptably on vertical substrates. The viscosity measured at 1000 $s^{-1}$ of the coating composition can be any value or range between (and include) any of the values recited above.

The coating composition has a shear thinning rheological profile, in other words, the viscosity of the coating composition is higher at low shear rates than the viscosity at high shear rates. As a nonlimiting example, the coating composition can have a viscosity measured at 0.1 $s^{-1}$ (low shear rate, unless otherwise indicated, low shear rate refers to 0.1 $s^{-1}$) that can be at least 6, such as at least 10, at least 20, at least 30, and at least 40, and can be up to 1,200, in such as up to 1,000, up to 750, up to 500, and up to 350 times higher than the viscosity of the coating composition measured at 1000 $s^{-1}$ (high shear rate), referred to as the viscosity ratio and the viscosity measured at 0.1 $s^{-1}$ can be from 6 to 1,200, such as 6 to 1,000, 6 to 750, 6 to 500, 6 to 350, 10 to 1,200, 10 to 1,000, 10 to 750, 10 to 500, 10 to 350, 20 to 1,200, 20 to 1,000, 20 to 750, 20 to 500, 20 to 350, 30 to 1,200, 30 to 1,000, 30 to 750, 30 to 500, 30 to 350, 40 to 1,200, 40 to 1,000, 40 to 750, 40 to 500, and 40 to 350 times higher than the viscosity of the coating composition measured at 1000 $s^{-1}$, measured using an Anton Paar MCR 301 rheometer at 25° C. with a Double Gap Cylinder equipped with a DG26.7 measuring system. If the shear thinning property of the coating composition is too high or too low, it may not properly flow through an applicator, separate streams may not merge as desired and/or the coating composition may sag unacceptably on vertical substrates. The shear thinning property of the coating composition can be any value or range between (and include) any of the values recited above.

The viscosity of the coating composition can be measured by various techniques known in the art, nonlimiting examples include parallel plate, cone and plate and cup and spindle methods. As described, the viscosity ratio can be observed independent on the method used. As nonlimiting examples, measurement of rheological properties described herein can be determined using instruments available from Anton Paar (MCR 301, MCR 302, MCR 502, and MCR 702) as well as instruments available from TA Instruments (ARES-G2, Discovery HR 10, Discovery HR 20 and Discovery HR 30).

As a particular nonlimiting example, the viscosity of the coating composition can be measured using an Anton Paar MCR 301 rheometer with a Double Gap Cylinder equipped with a DG26.7 measuring system using a high shear rate at 1000 $s^{-1}$ for 30 s and a subsequent low shear rate at 0.1 $s^{-1}$ for 180 s.

As a particular nonlimiting example, the viscosity of the coating composition can be measured using an Anton-Paar MCR 301 rheometer using a 50 millimeter parallel plate-plate fixture with temperature-control. The plate-plate distance is kept at a fixed distance of 0.2 mm and the temperature is a constant 25° C.

The recovery time of the coating composition can be determined using an Anton Paar MCR 301 rheometer with a Double Gap Cylinder as described above. Following exposure of the coating to high shear rate at 1000 $s^{-1}$ for 30 s the recovery time is measured as the time between the starting point of the low shear test (shear rate of 0.1 $s^{-1}$) and the point where the viscosity of the composition is 63% of the prior value before exposure to high shear rate.

The recovery time of the coating composition can be at least 1 second, such as at least 1.5 seconds, at least 2 seconds, at least 3 seconds and at least 5 seconds and can be up to 100 seconds, such as up to 75 seconds, up to 50 seconds, up to 25 seconds and up to 19 seconds and can be from 1 to 100 seconds, such as 1 to 75 seconds, 1 to 50 seconds, 1 to 25 seconds, 1 to 19 seconds, 1.5 to 100 seconds, 1.5 to 75 seconds, 1.5 to 50 seconds, 1.5 to 25 seconds, 1.5 to 19 seconds, 2 to 100 seconds, 2 to 75 seconds, 2 to 50 seconds, 2 to 25 seconds, 2 to 19 seconds, 3 to 100 seconds, such as 3 to 75 seconds, 3 to 50 seconds, 3 to 25 seconds, 3 to 19 seconds, 5 to 100 seconds, 5 to 75 seconds, 5 to 50 seconds, 5 to 25 seconds, and 5 to 19 seconds. When the recovery time is too short, depositions of the coating composition may not merge satisfactorily. When the recovery time is too long, the coating composition may exhibit undesirable sag. The recovery time for the coating composition can be any value or range between (and include) any of the values recited above.

The film-forming constituents of the coating composition and can include polymers, resins, crosslinking agents or any combination thereof capable of forming a film when applied to a substrate.

The polymers and resins included as film-forming constituents in the coating composition include those commonly used in coating compositions. Nonlimiting examples of suitable polymers and resins include acrylic resins, polyester resins, alkyd resins, polyurethane resins, polyolefin resins, silanes, epoxy and siloxane resins and combinations thereof. The polymers and resins included as film-forming constituents in the coating composition can have a number average molecular weight of at least 250 g/mol, such as at least 500 g/mol, at least 750 g/mol, and at least 1,000 g/mol and can be up to 500,000 g/mol, such as up to 100,000 g/mol, up to 50,000 g/mol, up to 20,000 g/mol and up to 10,000 g/mol and can be from 250 to 500,000 g/mol, such as 500 to 500,000 g/mol, 750 to 500,000 g/mol, 1,000 to 500,000 g/mol, 250 to 100,000 g/mol, 500 to 100,000 g/mol, 750 to 100,000 g/mol, 1,000 to 100,000 g/mol, 250 to 50.00 g/mol, 500 to 50,000 g/mol, 750 to 50,000 g/mol, 1,000 to 50,000 g/mol, 250 to 20,000 g/mol, 500 to 20,000 g/mol, 750 to 20,000 g/mol, 1,000 to 20,000 g/mol, 250 to 10,000 g/mol, 500 to 10,000 g/mol, 750 to 10,000 g/mol, 1,000 to 10,000 g/mol. The weight average molecular weight of polymers and resins included as film-forming constituents in the coating composition can be at least 500 g/mol, such as at least 800 g/mol, at least 1,200 g/mol and at least 2,000 g/mol and can be up to 500,000 g/mol, such as up to 200,000 g/mol and up to 50,000 g/mol and from 500 to 500,000 g/mol, such as 800 to 500,000 g/mol, 1,200 to 500,000 g/mol, 2,000 to 500,000 g/mol, 500 to 200,000 g/mol, 800 to 200,000 g/mol, 1,200 to 200,000 g/mol, 2,000 to 200,000 g/mol, 500 to 50,000 g/mol, 800 to 50,000 g/mol, 1,200 to 50,000 g/mol, and 2,000 to 50,000 g/mol. The number average molecular weight and weight average molecular weight of polymers and resins included as film-forming constituents in the coating composition can be any value or range between (and include) any of the values recited above.

In many cases, the polymers and resins can have crosslinkable functional groups. Nonlimiting examples of suitable crosslinkable functional groups include carbamate, carboxylic acid, alkoxy silanes, hydroxyl groups, carboxyl groups, epoxy groups, UV curable functional groups and combinations thereof. The polymers and resins can be used alone, or two or more can be used in combination in the coating compositions.

One suitable class of film-forming polymer for the film-forming resins includes, but is not limited to, those which are derived from ethylenically unsaturated monomers. Particularly useful members of this class are the acrylic polymers, such as polymers or copolymers of alkyl esters of (meth) acrylic acid, optionally together with other ethylenically unsaturated monomers. These polymers can be thermosetting and crosslinkable. Suitable (meth)acrylic esters include, but are not limited to, ethyl (meth)acrylate, propyl (meth) acrylate, n-butyl (meth)acrylate, isobutyl (meth)acrylate, tert-butyl (meth)acrylate, 2-ethylhexyl (meth)acrylate, lauryl (meth)acrylate. Cyclic esters such as cyclohexyl (meth) acrylate, isobornyl (meth)acrylate as well as hydroxyalkyl esters such as 2-hydroxy (meth)ethyl acrylate, 2-hydroxypropyl (meth)acrylate can also be used. In addition, vinyl aliphatic or vinyl aromatic compounds such as (meth)acrylonitrile, styrene, vinyl acetate, vinyl propionate and vinyl toluene can be used. For crosslinking, suitable functional monomers to be used in addition to the aforementioned include (meth)acrylic acid, hydroxyethyl (meth)acrylate, 2-hydroxypropyl (meth)acrylate, N-(alkoxymethyl) and (meth)acrylamides where the alkoxy group can be, as a nonlimiting example, a butoxy group, glycidyl acrylate, and/or glycidyl methacrylate.

As a nonlimiting example, the film-forming resins can include polyester polyols, which can be prepared in a known manner by condensation of polyhydric alcohols and polycarboxylic acids. Suitable polyhydric alcohols include ethyleneglycol, propylene glycol, butylene glycol, 1,6-hexyleneglycol, neopentyl glycol, diethylene glycol, glycerol, trimethylol propane, and pentaerythritol. Suitable polycarboxylic acids include succinic acid, adipic acid, azelaic acid, sebacic acid, maleic acid, fumaric acid, phthalic acid, tetrahydrophthalic acid, hexahydrophthalic acid and trimellitic acid. In addition to the polycarboxylic acids mentioned above, functional equivalents of the acids such as anhydrides where they exist or lower alkyl esters of the acids such as the methyl esters may be used.

As a nonlimiting example, the film-forming resins can include acrylic polyols, which can be prepared from a monomer mixture that includes a hydroxyl functional monomer. Mixtures of different acrylic polyols can be used. The hydroxyl functional monomer can include a hydroxyalkyl group. Suitable acrylic polyols include copolymers of alkyl esters of (meth)acrylic acid optionally together with other polymerizable ethylenically unsaturated monomers.

Nonlimiting examples of hydroxyl functional monomers that can be used in the acrylic polyols include hydroxyalkyl (meth)acrylates, typically having 2 to 12 carbon atoms in the hydroxyalkyl group, such as hydroxyethyl (meth)acrylate, hydroxypropyl (meth)acrylate, 4-hydroxybutyl (meth)acrylate, 5-hydroxypentyl (meth)acrylate, 6-hydroxyhexyl (meth)acrylate, 8-hydroxyoctyl (meth)acrylate, 9-hydroxynonyl (meth)acrylate, 10-hydroxydecyl (meth)acrylate, 11-hydroxyundecyl (meth)acrylate, 12-hydroxydodecyl (meth)acrylate, and the like; (4-(hydroxymethyl)cyclohexyl) methyl (meth)acrylate; hydroxy functional adducts of caprolactone and hydroxyalkyl (meth)acrylates, as well as the beta-hydroxy ester functional monomers, the reaction product of glycidyl methacrylate and versatic acid and the reaction product of Cardura™ E10p glycidyl ester (available from Hexion) reacted with methacrylic acid. The hydroxyl functional monomer can be included in the monomer mixture in an amount of at least 5 wt. %, such as at least 10 wt. % and at least 15 wt. %, and can be up to 70 wt. %, up to 60 wt. %, up to 50 wt. %, up to 45 wt. % and up to 40 wt. % and can be from 5 to 70 wt. %, such as 10 to 70 wt. %, 15 to 70 wt. %, 5 to 60 wt. %, 10 to 60 wt. %, 15 to 60 wt. %, 5 to 50 wt. %, 10 to 50 wt. %, 15 to 50 wt. %, 5 to 40 wt. %, 10 to 40 wt. %, and 15 to 40 wt. % based on the total weight of monomers in the monomer mixture used to prepare the acrylic polyol. The amount of hydroxyl functional monomers used in the acrylic polyols can be any value or range between (and include) any of the values recited above.

The acrylic polyol can have a weight average molecular weight of at least 1,000 g/mol, such as at least 2,000 g/mol, at least 3,000 g/mol, at least 5,000 g/mol, and at least 5,500 g/mol, and can be up to 50,000 g/mol, such as up to 30,000 g/mol, up to 15,000 g/mol, up to 10,000 g/mol and up to 7,500 g/mol and can be from 1,000 to 50,000 g/mol, such as 1,000 to 30,000 g/mol, 1,000 to 15,000 g/mol, 1,000 to 10,000 g/mol, 1,000 to 7,500 g/mol, 2,000 to 50,000 g/mol, 2,000 to 30,000 g/mol, 2,000 to 15,000 g/mol, 2,000 to 10,000 g/mol, 2,000 to 7,500 g/mol, 3,000 to 50,000 g/mol, 3,000 to 30,000 g/mol, 3,000 to 15,000 g/mol, 3,000 to 10,000 g/mol, 3,000 to 7,500 g/mol, 5,000 to 50,000 g/mol, 5,000 to 30,000 g/mol, 5,000 to 15,000 g/mol, 5,000 to 10,000 g/mol, and 5,000 to 7,500 g/mol. The weight average molecular weights as reported herein can be determined by gel permeation chromatography (GPC) using appropriate polystyrene standards. The weight average molecular weight of the acrylic polyols can be any value or range between (and include) any of the values recited above.

Useful alkyl esters of (meth)acrylic acid include, but are not limited to, aliphatic alkyl esters containing from 1 to 30, and often 2 to 18 carbon atoms in the alkyl group. Nonlimiting examples include methyl (meth)acrylate, ethyl (meth)acrylate, butyl (meth)acrylate, and 2-ethylhexyl (meth)acrylate. Suitable other copolymerizable ethylenically unsaturated monomers include vinyl aromatic compounds such as styrene and vinyl toluene; nitriles such as (meth)acrylonitrile; vinyl and vinylidene halides such as vinyl chloride and vinylidene fluoride and vinyl esters such as vinyl acetate.

The film forming resins can include polyesters and polyesters functionalized with carbamate.

Nonlimiting examples of suitable crosslinking agents include: diisocyanate, dihydrazides, diepoxide, and condensates of formaldehyde with a nitrogenous compound such as urea, thiourea, melamine or benzoguanamine, or lower alkyl ethers of such condensates in which the alkyl group typically contains from 1 to 4 carbon atoms, typically referred to as an aminoplast. Other nonlimiting examples of crosslinking agents are melamine-formaldehyde condensates in which a substantial proportion of the methylol groups have been etherified by reaction with butanol or alcohols like ethanol or methanol, carbodiimides, polyols, phenolic resins, epoxy resins, beta-hydroxy (alkyl) amide resins, hydroxy (alkyl) urea resins, oxazoline, alkylated carbamate resins, (meth) acrylates, isocyanates, blocked isocyanates, polyacids, anhydrides, organometallic acid-functional materials, polyamines, polyamides, aziridines, and combinations thereof.

Any of these crosslinking agents known to those skilled in the art for use with curable acrylic polymers can be used. For the purposes of the foregoing, the crosslinking agent, where present, can be considered as being a part of the film-forming resin material.

Other nonlimiting examples of suitable classes of polymers useful as the curable film-forming resins are:
(i) a polyepoxide and a polyacid crosslinking agent;
(ii) a (meth)acrylosilane polymer, a (meth)acrylic polyol polymer, an alkylated melamine-formaldehyde crosslinking agent; and
(iii) a polyisocyanate and a polymer having a group that is reactive with isocyanate.

Nonlimiting examples of polyisocyanates include aliphatic and aromatic polyisocyanate and mixtures thereof. As particular nonlimiting examples, higher polyisocyanates such as isocyanurates of diisocyanates can be used; diisocyanates, uretdione and biuret can also be used. Isocyanate prepolymers, nonlimiting examples including the reaction products of polyisocyanates with polyols also can be used. Mixtures of polyisocyanate crosslinking agents can be used.

As nonlimiting examples, the polyisocyanate can be prepared from a variety of isocyanate-containing materials. Nonlimiting examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used.

Isocyanate groups can be capped or uncapped as desired. If the polyisocyanate is to be blocked or capped, any suitable aliphatic, cycloaliphatic, or aromatic alkyl monoalcohol or phenolic compound known to those skilled in the art can be used as a capping agent for the polyisocyanate. Nonlimiting examples of suitable blocking agents include those materials which would unblock at elevated temperatures such as aliphatic alcohols including methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers can also be used as capping agents. Nonlimiting examples of suitable glycol ethers include ethylene glycol butyl ether, diethylene glycol butyl ether, ethylene glycol methyl ether and propylene glycol methyl ether. Nonlimiting examples of other suitable capping agents include oximes such as methyl ethyl ketoxime, acetone oxime and cyclohexanone oxime, lactams such as epsilon-caprolactam, pyrazoles such as dimethyl pyrazole, and amines such as dibutyl amine.

Depending upon if a crosslinking agent is used and the composition of the coating composition, the coating compositions can be formulated as one-pack (1K), two-pack (2K) or multi-pack coating compositions. As a nonlimiting example, one-pack coating compositions can be air-dry coatings or un-activated coatings that dry primarily by solvent evaporation and do not require crosslinking to form a coating film having desired properties. As a nonlimiting example, one pack can contain a combination of reactive functional polymers and crosslinkers that are stable during storage and only react when subjected to elevated temperatures. As a nonlimiting example, if polyisocyanates with free isocyanate groups are used as the crosslinking agent, the coating composition can be formulated as a two-pack or multi-pack coating composition in that the crosslinking agent can be mixed with other components of the coating composition only shortly before coating application. As a nonlimiting example, if blocked polyisocyanates are, for example, used as the crosslinking agent, the coating compositions can be formulated as a one-pack (1K) coating composition. As a nonlimiting example, one-pack (1K) formulations can react with atmospheric moisture and crosslink.

The amount of film-forming resins in the coating composition typically includes any film-forming polymers and crosslinking agents included in the coating composition. The amount of film-forming resins in the coating composition can be at least 0.1 wt. %, such as at least 0.5 wt. %, at least 1 wt. %, at least 5 wt. %, at least 10 wt. %, at least 15 wt. % and at least 20 wt. % and can be up to 70 wt. %, such as up to 65 wt. %, up to 60 wt. %, up to 55 wt. % and up to 50 wt. % and can be from 0.1 wt. % to 70 wt. %, such as 0.5 wt. % to 70 wt. %, 1 wt. % to 70 wt. %, 5 wt. % to 70 wt. %, 10 wt. % to 70 wt. %, 15 wt. % to 70 wt. %, 20 wt. % to 70 wt. %, 1 wt. % to 60 wt. %, 5 wt. % to 60 wt. %, 10 wt. % to 60 wt. %, 15 wt. % to 60 wt. %, 20 wt. % to 60 wt. %, 1 wt. % to 50 wt. %, 5 wt. % to 50 wt. %, 10 wt. % to 50 wt. %, 15 wt. % to 50 wt. % and 20 wt. % to 50 wt. % based on the weight of the coating composition. If the amount of film-forming resin is too low, the final coating may not have desired properties and if the amount of film-forming resin is too high, it may the coating composition may not have a desired rheological profile. The amount of film-forming resin in the coating composition can be any value or range between (and include) any of the values recited above. The number average and weight average molecular weight for the film forming resins is as recited above.

The coating compositions described herein can be thermosetting compositions.

When 1-K compositions are used as described herein, the coating compositions can include an alkoxy and/or silanol-functional silicone. Nonlimiting examples of suitable silanol-functional silicones that can be used in the coating compositions described herein are disclosed in U.S. Pat. No. 8,722,835 col. 3, line 27 through col. 4, line 3, the specified disclosure of which is incorporated herein by reference. The coating compositions can include an alkoxy-functional silicone. Nonlimiting examples of suitable alkoxy-functional silicones that can be used in the coating compositions described herein are disclosed in U.S. Pat. No. 8,722,835 col. 4, line 32 through col. 5, line 6, the specified disclosure of which is incorporated herein by reference. The alkoxy and/or silanol-functional silicone can have a weight average molecular weight of at least 200 g/mol, such as at least 700 g/mol and at least 1,000 g/mol and can be up to 300,000 g/mol, such as up to 200,000 g/mol and up to 100,000 g/mol. The weight average molecular weight of the alkoxy and/or silanol-functional silicones can be any value or between (and include) any of the values recited above. The weight average molecular weight can be determined by gel permeation chromatography (GPC) using appropriate polystyrene standards.

When multi-pack or 2-K compositions are used as described herein, the coating compositions can include an epoxy-polysiloxane composition. Nonlimiting examples of suitable epoxy-polysiloxane compositions that can be used in the coating compositions described herein are disclosed in U.S. Pat. No. 8,722,835 col. 15, lines 4 through 45, the specified disclosure of which is incorporated herein by reference.

The coating composition can be a clearcoat. When used as a clearcoat, the coating composition provides a topcoat layer optionally used with a multi-layer coating system. The coating composition can be free of colorants. Further, the clearcoat can be a coating layer that can be at least substantially transparent or fully transparent. The clearcoat can include colorants that do not interfere with the desired transparency of the clear topcoat layer.

The coating compositions can include pigments and/or dyes as colorants. Non-limiting examples of suitable pigments include organic and/or inorganic materials, non-treated aluminum, treated aluminums (with silica, inorganic pigments and/or organic pigments), titanium dioxide, zinc oxide, iron oxide, carbon black, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), mono azo red, red iron oxide, quinacridone maroon, transparent red oxide, cobalt blue, iron blue, iron oxide yellow, chrome titanate, titanium yellow, nickel titanate yellow, transparent yellow oxide, lead chromate yellow, bismuth vanadium yellow, pre darkened chrome yellow, transparent red oxide chip, iron oxide red, molybdate orange, molybdate orange red, radar reflective pigments, LiDAR reflective pigments, corrosion inhibiting pigments, and combinations thereof.

Non-limiting examples of suitable dyes include those that are solvent and/or aqueous based such as acid dyes, azoic dyes, basic dyes, direct dyes, disperse dyes, reactive dyes, solvent dyes, sulfur dyes, mordant dyes, nonlimiting examples including bismuth vanadate, anthraquinone, perylene, aluminum, quinacridone, thiazole, thiazine, azo, indigoid, nitro, nitroso, oxazine, phthalocyanine, quinoline, stilbene, and triphenyl methane, dioxazine carbazole violet, phthalocyanine blue, indanthrone blue, mono azo permanent orange, ferrite yellow, diarylide yellow, indolinone yellow, monoazo yellow, benzimidazolone yellow, isoindoline yellow, tetrachloroisoindoline yellow, disazo yellow, anthanthrone orange, quinacridone orange, benzimidazolone orange, phthalocyanine green, quinacridone red, azoic red, diketopyrrolopyrrole red, perylene red, scarlet or maroon, quinacridone violet, thioindigo red, and combinations thereof.

The coating composition can include a radar reflective pigment or a LiDAR reflective pigment or an infrared reflective pigment. The LiDAR, radar reflective pigment or infrared reflective pigment can include, but is not limited to, nickel manganese ferrite blacks (Pigment Black 30), iron chromite brown-blacks (CI Pigment Green 17, CI Pigment Browns 29 and 35), Pigment Blue 28, Pigment Blue 36, Pigment Green 26, Pigment Green 50, Pigment Brown 33, Pigment Brown 24, Pigment Black 12 and Pigment Yellow 53 and combinations thereof.

As a nonlimiting example, the LiDAR reflective pigment can include a semiconductor and/or a dielectric ("SCD") in which a metal can be dispersed. The medium (e.g., SCD) in which the metal can be dispersed may also be referred to herein as the matrix. The metal and matrix can form a non-homogenous mixture that can be used to form the pigment. The metal can be dispersed uniformly or non-uniformly throughout the matrix. The semiconductor of the LiDAR reflective pigment can include, as nonlimiting examples, silicon, germanium, silicon carbide, boron nitride, aluminum nitride, gallium nitride, silicon nitride, gallium arsenide, indium phosphide, indium nitride, indium arsenide, indium antimonide, zinc oxide, zinc sulfide, zinc telluride, tin sulfide, bismuth sulfide, nickel oxide, boron phosphide, titanium dioxide, barium titanate, iron oxide, doped version thereof (i.e., an addition of a dopant, such as, for example, boron, aluminum, gallium, indium, phosphorous, arsenic, antimony, germanium, nitrogen, at a weight percentage of 0.01% or less based on the weight of the LiDAR reflective pigment), alloyed versions of thereof, other semiconductors, or combinations thereof. As a nonlimiting example, the LiDAR reflective pigment can comprise silicon. The dielectric of the LiDAR reflective pigment can comprise solid insulator materials (e.g., silicon dioxide), ceramics (e.g., aluminum oxide, yttrium oxide, yttria alumina garnet (YAG), neodymium-doped YAG (Nd:YAG)), glass (e.g., borosilicate glass, soda lime silicate glass, phosphate glass), organic materials, doped versions thereof, other dielectrics, or combinations thereof. The organic material can comprise, for example, acrylics, alkyds, chlorinated polyether, diallyl phthalate, epoxies, epoxy-polyamid, phenolics, polyamide, polyimides, polyesters (e.g., PET), polyethylene, polymethyl methacrylate, polystyrene, polyurethanes, polyvinyl butyral, polyvinyl chloride (PVC), copolymer of PVC and vinyl, acetate, polyvinyl formal, polyvinylidene fluoride, polyxylylenes, silicones, nylons and copolymers of nylons, polyamide-polymide, polyolefin, polytetrafluoroethylene, other polymers, or combinations thereof. If the dielectric comprises organic materials, the organic materials are selected such that the pigment formed therefrom is resistant to melting and/or resistant to changes in dimension or physical properties upon incorporation into a coating, film, and/or article formulation. The metal in the LiDAR reflective pigment can comprise, for example, aluminum, silver, copper, indium, tin, nickel, titanium, gold, iron, alloys thereof, or combinations thereof. The metal can be in particulate form and can have an average particle size in a range of 0.5 nm to 100 nm, such as, for example, 1 nm to 10 nm as measured by a transmission electron microscope (TEM) at 100 kV. The metal can be in particulate form and can have an average particle size less than or equal to 20 nm as measured by TEM. Suitable methods of measuring particle sizes by TEM include suspending metal particles in a solvent, and then drop casting the suspension onto a TEM grid which is allowed to dry under ambient conditions. Particle size measurements may be obtained from images acquired using a Tecnai T20 TEM operating at 200 kV and analyzed using ImageJ software, or an equivalent instrument and software.

As a nonlimiting example, the coating composition can include corrosion inhibiting pigments. Any suitable corrosion inhibiting pigment known in the art can be utilized in the coating compositions, nonlimiting examples include Calcium Strontium Zinc Phosphosilicate; double orthophosphates, in which one of the cations is represented by zinc, nonlimiting examples being Zn—Al, Zn—Ca, Zn—K, Zn—Fe, Zn—Ca—Sr, Ba—Ca, Sr—Ca and combinations thereof; combinations of phosphate anion with anticorrosively efficient anions, nonlimiting examples being silicate, molybdate, and borate; modified phosphate pigments modified by organic corrosion inhibitors and combinations thereof. Nonlimiting examples of modified phosphate pigments include aluminum(III) zinc(II) phosphate, basic zinc phosphate, zinc phosphomolybdate, zinc calcium phosphomolybdate, zinc borophosphate, zinc strontium phosphosilicate, calcium barium phosphosilicate, calcium strontium zinc phosphosilicate, and combinations thereof. Other nonlimiting examples of corrosion inhibiting pigments that can be used in the coating formulation include zinc 5-nitroisophthalate, calcium 5-nitroisophthalate, calcium cyanurate, metal salts of dinonylnaphthalene sulfonic acids, and combinations thereof.

When colorants are included in the coating compositions, the colorants can be included at a level of at least 0.1 wt. %, such as at least 0.15 wt. %, at least 0.2 wt. %, at least 0.5 wt. % and at least 1 wt. % and can be included at up to 40 wt. %, such as up to 37 wt. %, and up to 34 wt. % based on the weight of the coating composition. Further the amount of colorant can be from 0.1 to 40 wt. %, such as from 0.15 to 38 wt. % and from 1 to 34 based on weight of the coating composition. When the amount of colorant is too low, the desired color effect from the coating may not be achieved. When the amount of colorant is too high, the rheological profile of the coating composition may be adversely affected. When colorants are included in the coating compositions, the colorants can be included at any level or range between (and include) any of the levels indicated above.

As a nonlimiting example, the coating compositions can include various other components, such as binders, carriers, water, catalysts, conventional additives, or combinations thereof. Conventional additives can include, but are not limited to, dispersants, antioxidants, and absorbers, wetting agents, leveling agents, antifoaming agents, anti-cratering agents, thermoplastic resins, plasticizers, abrasion resistant particles, fillers including, but not limited to, micas, talc, clays, and inorganic minerals, metal oxides, metal flake, various forms of carbon, anti-oxidants, hindered amine light stabilizers, UV light absorbers and stabilizers, surfactants, flow and surface control agents, thixotropic agents, reactive diluents, catalysts, reaction inhibitors, corrosion-inhibitors, other customary auxiliaries and combinations thereof. The coating composition can be suitable for application to a substrate.

As a nonlimiting example, when a metal flake pigment is used, it can have an aspect ratio of from 5:1 to 500:1, such as from 10:1 to 200:1.

As described above, the coating composition has a shear thinning rheological profile, generally non-Newtonian behavior where viscosity decreases under increasing shear strain. As such, the shear thinning rheological profile can be achieved by including rheological modifiers to the coating composition. The rheological modifiers can include natural gums, synthetic resins, organoclays, hydrogenated castor oils, fumed silicas, polyamides, overbased sulfonates, inorganic crystals, non-aqueous dispersions, organoclays and polyurea compounds that are minimally soluble in organic solvents.

Rheological modifiers can be included in the coating composition to provide multiple rheological properties. As non-limiting examples, the rheological modifiers can provide a desirable high shear viscosity allowing the coating composition to flow through an applicator and a low shear viscosity that is high enough to minimize sag on vertical substrates, but not so high as to prevent applied streams from merging on a substrate to form a uniform coating. As another nonlimiting example, the rheological modifiers can provide a desirable recovery time that is short enough to minimize sag on vertical substrates, but not so short as to prevent applied streams or droplets from merging on a substrate to form a uniform coating.

The rheological modifiers can be present in the coating composition at a level of at least 0.1 wt. %, such as at least 0.2 wt. %, at least 0.5 wt. %, at least 0.6 wt. % at least 0.75 wt. % and more than 1 wt. % and can be included at up to 25 wt. %, such as up to 15 wt. %, up to 12.5 wt. %, and up to 10 wt. % and from 0.1 wt. % to 25 wt. %, such as 0.2 wt. % to 25 wt. %, 0.5 wt. % to 25 wt. %, 0.75 wt. % to 25 wt. %, 1 wt. % to 25 wt. %, 0.1 wt. % to 15 wt. %, 0.2 wt. % to 15 wt. %, 0.5 wt. % to 15 wt. %, 0.75 wt. % to 15 wt. %, 1 wt. % to 15 wt. %, 0.1 wt. % to 10 wt. %, 0.2 wt. % to 10 wt. %, 0.5 wt. % to 10 wt. %, 0.75 wt. % to 10 wt. % and 1 wt. % to 10 wt. % based on the weight of the coating composition. If the amount of rheological modifier is less than or more than the amounts described above, the coating composition may not have the desired rheological profile described herein. The amounts of rheological modifiers included in the coating composition can be any value or range between (and include) any of the values recited above.

A class of rheological modifiers includes sag control agents (SCA). Nonlimiting examples of SCAs include polyureas, polyamides, polyamide waxes, crosslinked polymeric microparticles, inorganic phyllosilicates, aluminum magnesium silicates, sodium magnesium phyllosilicates, sodium magnesium fluorine lithium phyllosilicates, montmorillonites, kaolins, silicas, polyvinyl alcohol, poly(meth)acrylamide, poly(meth)acrylic acid, polyvinylpyrrolidone, styrene-maleic anhydride copolymers and ethylene-maleic anhydride copolymers. The amount of sag control agent in the coating composition can be at least 0.1 wt. %, such as at least 0.25 wt. % and at least 0.5 wt. % and can be up to 6 wt. %, such as up to 5 wt. %, 4 wt. % and up to 3 wt. % and from 0.1 wt. % to 6 wt. %, such as 0.25 wt. % to 6 wt. %, 0.5 wt. % to 6 wt. %, 0.1 wt. % to 4 wt. %, 0.25 wt. % to 4 wt. %, 0.5 wt. % to 4 wt. %, 0.1 wt. % to 3 wt. %, 0.25 wt. % to 3 wt. % and 0.5 wt. % to 3 wt. %. When the amount of SCA is too low the coating composition can exhibit undesirable sagging. When the amount of SCA is too high the coating composition may not exhibit a desired rheological profile as described herein. The amounts of SCA included in the coating composition can be any value or range between (and include) any of the values recited above. The SCA can have a number average molecular weight of from 380 g/mol to 1,000 g/mol.

As a nonlimiting example, the rheological modifier can include a combination of insoluble spheroids, low density non-porous particles and insoluble needle or rod-like crystals to provide the desired combination of rheological properties.

Nonlimiting examples of insoluble spheroids include submicron sized particles produced via non-aqueous dispersion polymerization. In addition to contributing to the rheological profile of the coating composition, the submicron sized particles can prevent crack propagation, improve toughness and reduce energy requirements for drying the coating composition. Nonlimiting examples include either alone or in any combination hypercrosslinked polymer microspheres, highly cross-linked acrylic polymeric particles, and cross-linked hydroxyl functional polyacrylic resins many of which are available from ALLNEX Netherlands B.V. under the SETALUX brand.

Nonlimiting examples of suitable non-aqueous dispersions include internally crosslinked organic polymers. The internally crosslinked organic polymers can be in a non-aqueous dispersion and can include an acrylic polymer and can be prepared from a monomer mixture that includes a monomer having functional groups that allow for crosslinking with itself and potentially with adjacent polymers, allowing for the formation of a gel or a microgel. As nonlimiting examples, any monomer known in the art which contains at least two ethylenically unsaturated double bonds can be included in the monomer mixture. Suitable monomers include, without limitation, di(meth)acrylates (e.g., hexanediol di(meth)acrylate), ethylene glycol di(meth)acrylate, butanediol di(meth)acrylate, decanediol di(meth)acrylate, or a combination of di(meth)acrylates. A nonlimiting example of a suitable internally crosslinked organic polymer can be prepared from a monomer mixture that includes: (i) methyl methacrylate; (ii) butyl acrylate; (iii) styrene; and (iv) ethylene glycol dimethacrylate. Nonlimiting examples for preparing the non-aqueous dispersions can be found at col. 4, line 61 through col. 6, line 60 of U.S. Pat. No. 4,147,688 and col. 2, line 43 through col. 6, line 13 of U.S. Pat. No. 9,434,828, the specified sections of which are incorporated herein by reference.

As a nonlimiting example, the internally crosslinked organic polymer can be dispersed in an organic continuous phase that includes an organic solvent or polymer using high stress mixing or homogenization to form the non-aqueous dispersion. Nonlimiting examples of non-aqueous media for use as the organic continuous phase include ketones such as methyl amyl ketone, and glycol ethers such as 2-butoxyethanol.

The particle size of the non-aqueous dispersions can be from 0.1 to 1.2 μm ($Dv_{50}$) as measured by monochromatic light scattering using a spectrophotometer. Particle size can be measured by dynamic light scattering such as with a Malvern Zetasizer, which is a high performance two angle particle size analyzer for the enhanced detection of aggregates and measurement of small or dilute samples, and samples at very low or high concentration using dynamic light scattering. As used herein, "$Dv_{50}$" refers to the maximum particle diameter below which 50% of the sample volume exists—also referred to as the median particle size by volume.

The amount of insoluble spheroids in the coating composition can be at least 0.1 wt. %, such as at least 0.25 wt. % and at least 0.5 wt. % and can be up to 5 wt. %, such as up to 4 wt. % and up to 3 wt. % and from 0.1 wt. % to 5 wt. %, such as 0.25 wt. % to 5 wt. %., 0.5 wt. % to 5 wt. %, 0.1 wt. % to 4 wt. %, 0.25 wt. % to 4 wt. %, 0.5 wt. % to 4 wt. %, 0.1 wt. % to 3 wt. %, 0.25 wt. % to 3 wt. %, 0.5 wt. % to 3 wt. % based on the weight of the coating composition. When the amounts of insoluble spheroids is too low or too high the coating composition may not exhibit a desired rheological profile as described herein. The amounts of insoluble spheroids included in the coating composition can be any value or range between (and include) any of the values recited above.

Nonlimiting examples of low density non-porous particles include fumed silica, and clays such as Montmorillonites, bentonites and kaolin and combinations thereof.

As a nonlimiting example, the low density non-porous particles can include a silica-based rheology control agent, as a nonlimiting example, fumed silica particles conventionally used as rheology control agents.

The amount of low density non-porous particles in the coating composition can be at least 0.1 wt. %, such as at least 0.25 wt. % and at least 0.5 wt. % and can be up to 5 wt. %, such as up to 4 wt. % and up to 3 wt. % and from 0.1 wt. % to 5 wt. %, such as 0.25 wt. % to 5 wt. %., 0.5 wt. % to 5 wt. %, 0.1 wt. % to 4 wt. %, 0.25 wt. % to 4 wt. %, 0.5 wt. % to 4 wt. %, 0.1 wt. % to 3 wt. %, 0.25 wt. % to 3 wt. %, 0.5 wt. % to 3 wt. % based on the weight of the coating composition. When the amounts of low density non-porous particles is too low or too high the coating composition may not exhibit a desired rheological profile as described herein. The amounts of low density non-porous particles included in the coating composition can be any value or range between (and include) any of the values recited above.

Nonlimiting examples of insoluble needles or rod-like crystals include natural gums, calcite, organic transition metal complexes, the reaction product of amines or polyamines and polyisocyanates, the reaction product of aromatic amines and polyisocyanates and combinations thereof. The isocyanate containing materials present as insoluble needles or rod-like crystals are separate from any isocyanate containing materials used as crosslinking agents. Nonlimiting examples of insoluble needle or rod-like crystals can include the reaction product of benzyl amine and hexane diisocyanate.

Not being limited to any single theory, the insoluble needles or rod-like crystals can assume random orientations when not under shear stress and orient in parallel fashion in the direction of shear strain or flow when a shear stress is applied, such as when flowing through an applicator and one or more nozzles. The initial random orientation can be reinforced by polar moieties in the molecules making up the needle or rod-like crystals that tend to associate with one another in the non-aqueous environment in the coating composition. As a nonlimiting example, the polar moiety association can include hydrogen bond formation between the needle or rod-shaped crystals. The initial random orientation, and any polar and/or hydrogen bonding reinforcement, is believed to create increased resistance to flow, or viscosity, which is greatly decreased after sufficient shear stress is applied to the coating composition, flow is initiated and any associations between crystals is disrupted leading to a decrease in the viscosity of the coating composition. Once the shear stress is removed, as in after the coating composition is applied to a substrate, the insoluble needle or rod-like crystals transition to their random configuration and reform any polar or hydrogen bonding associations. In this latter state, resistance to flow is restored and, as a nonlimiting example, sagging of the coating composition is minimized on vertical substrates.

The primary particle size ($Dv_{50}$) of the insoluble needles or rod-like crystals can be within the micron or sub-micron range, and can range from at least 0.1 μm, such as at least 0.5 μm and at least 1 μm and can be up to 15 μm, such as up to 10 μm, up to 7.5 μm and up to 5 μm and can be from 0.1 μm to 15 μm, such as 0.1 μm to 10 μm, 0.1 μm to 7.5 μm, 0.1 μm to 5 μm, 0.5 μm to 15 μm, 0.5 μm to 10 μm, 0.5 μm to 7.5 μm, 0.5 μm to 5 μm, 1 μm to 15 μm, 1 μm to 10 μm, 1 μm to 7.5 μm and 1 μm to 5 μm (microns) as measured using a Malvern Zetasizer dynamic light scattering instrument. The primary particle size of the insoluble needles or rod-like crystals can be any value or range between (and include) any of the values recited above.

Particle size can be measured using an instrument such as a Mastersizer 2000, available from Malvern Instruments, Ltd., of Malvern, Worcestershire, UK, or an equivalent instrument. The Mastersizer 2000 directs a laser beam (0.633 mm diameter, 633 nm wavelength) through a dispersion of particles (in distilled, deionized or filtered water to 2-3% obscuration), and measures the light scattering of the dispersion (measurement parameters 25° C., 2200 RPM, 30 sec premeasurement delay, 10 sec background measurement, 10 sec sample measurement). The amount of light scattered by the dispersion is inversely proportional to the particle size. A series of detectors measure the scattered light and the data are then analyzed by computer software (Malvern Mastersizer 2000 software, version 5.60) to generate a particle size distribution, from which particle size can be routinely determined. The sample of dispersion of particles optionally may be sonicated prior to analysis for particle size. The sonication process comprises: (1) mixing the dispersion of particles using a Vortex mixer (Fisher Scientific Vortex Genie 2, or equivalent); (2) adding 15 mL of distilled deionized, ultra-filtered water to a 20 mL screw-cap scintillation vial; (3) adding 4 drops of the dispersion to the vial; (4) mixing the contents of the vial using the Vortex mixer; (5) capping the vial and placing it into an ultrasonic water bath (Fisher Scientific Model FS30, or equivalent) for 5 minutes; (6) vortexing the vial again; and (7) adding the sample dropwise to the Mastersizer to reach an obscuration between 2-3 for particle size distribution analysis described above.

As a nonlimiting example, the insoluble needles or rod-like crystals can include urea-based compounds, which can include reaction products of reactants, as nonlimiting examples, including an amine and an isocyanate, in many cases in the form of a bisurea. The reaction product can be crystalline. Nonlimiting examples of suitable isocyanates include polyisocyanates. The polyisocyanate can be aliphatic, aromatic, or a mixture thereof. Higher polyisocyanates such as isocyanurates of diisocyanates can be used.

As a nonlimiting example, the polyisocyanate used to prepare the insoluble needles or rod-like crystals can be prepared from a variety of isocyanate-containing materials. Nonlimiting examples of suitable polyisocyanates include toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. Trimers prepared from these diisocyanates can also be used.

Suitable amines that can be used to prepare the insoluble needles or rod-like crystals can be primary or secondary monoamines or mixtures thereof. The amines can be aromatic or aliphatic (e.g., cycloaliphatic). Non-limiting examples of suitable monoamines can include aliphatic polyamines such as ethylamine, isomeric propylamines, butylamines, pentylamines, hexylamines, cyclohexylamine, and benzylamine.

The amount of insoluble needle or rod-like crystals in the coating composition can be at least 0.1 wt. %, such as at least 0.25 wt. % and at least 0.5 wt. % and can be up to 5 wt. %, such as up to 4 wt. % and up to 3 wt. % from 0.1 wt. % to 5 wt. %, such as 0.25 wt. % to 5 wt. %, 0.5 wt. % to 5 wt. %, 0.1 wt. % to 4 wt. %, 0.25 wt. % to 4 wt. %, 0.5 wt. % to 4 wt. %, 0.1 wt. % to 3 wt. %, 0.25 wt. % to 3 wt. %, 0.5 wt. % to 3 wt. % based on the weight of the coating composition. When the amounts of insoluble needle or rod-like crystals is too low or too high the coating composition may not exhibit a desired rheological profile as described herein. The amounts of insoluble needle or rod-like crystals included in the coating composition can be any value or range between (and include) any of the values recited above.

The disclosure is also directed to methods of forming a coating layer on, at least a portion of a substrate. The methods include, but are not limited to, allowing any of the coating compositions described herein to flow through one or more applicators that include one or more nozzles capable of applying a shear stress on the coating composition. When the coating composition is exposed to the high shear stress in the nozzle, its viscosity is decreased as described above as it flows through the nozzle. The coating composition can either form a continuous stream or discrete droplets as it exits the nozzle. When the coating composition contacts the substrate, it forms a uniform coating.

The coating compositions can be applied over a substrate positioned substantially horizontal relative to the ground. As used herein, a substrate positioned "substantially horizontal relative to the ground" refers to a substrate having at least a portion of the surface being coated being parallel to or within 10°, such as within 5°, of being parallel to the ground.

The coating compositions can be applied over a substrate positioned substantially vertical relative to the ground. As used herein, a substrate positioned "substantially vertical relative to the ground" refers to a substrate having at least a portion of the surface being coated being perpendicular to or within 45°, such as within 40°, within 30°, within 20°, within 10°, or within 5°; of being perpendicular to the ground.

The coating compositions can have a surface tension such that the difference in the surface energy of the substrate and the surface tension of the coating composition, not coated or having a coating layer applied thereto (surface energy substrate-surface tension of coating composition), can be greater than 0, such as greater than 0.5 mN/m, greater than 0.7 mN/m, greater than 1 mN/m and greater than 2 mN/m as determined according to DIN EN 14370:2004-1 1 (Surface active agents—Determination of surface tension; German version DIN EN 14370; 2004; 2004-1 1) and the surface tension of the surface of the substrate can be determined according to DIN EN ISO 19403-2:2020-04 (Wettability—Part 2; Determination of the surface free energy of solid surfaces by measuring the contact angle). Not being bound to a particular theory, it is believed that the difference in surface tensions is believed to contribute, at least in part, to the coating composition being suitable for application with precision application devices that can apply the coating composition without overspray.

The coating composition can be applied over at least a portion of a substrate, whether not coated or at least partially having a coating layer applied thereto, to form a coating layer, nonlimiting examples including a primer coat layer, a basecoat layer, a clearcoat layer and a topcoat layer. Additionally, any of the coating compositions can be a one-component (1-K), two-component (2-K) or multi-component coating composition.

The substrate over which the coating composition can be applied includes a wide range of substrates. For example, the coating composition can be applied to a vehicle substrate, an industrial substrate, an aerospace substrate, and the like.

As a nonlimiting example, the substrate can include a polymer or a composite material such as a fiberglass composite. Vehicle parts typically formed from thermoplastic and thermoset materials include bumpers and trim.

Nonlimiting examples of substrates to which the coating compositions can be applied include rigid metal substrates such as ferrous metals, aluminum, aluminum alloys, copper, and other metal and alloy substrates. The ferrous metal substrates can include iron, steel, and alloys thereof. Nonlimiting examples of useful steel materials include cold rolled steel, galvanized (zinc coated) steel, electrogalvanized steel, stainless steel, pickled steel, zinc-iron alloys, and combinations thereof. Combinations or composites of ferrous and non-ferrous metals can also be used.

Nonlimiting examples of steel substrates (such as cold rolled steel or any of the steel substrates listed above) include those coated with a weldable, zinc-rich or iron phosphide-rich organic coating. Cold rolled steel can also suitable when pretreated with an appropriate solution known in the art, such as a metal phosphate solution, an aqueous solution containing a Group IIIB or IVB metal, an organophosphate solution, an organophosphonate solution, and combinations thereof, as discussed below. Nonlimiting examples of aluminum alloys include those alloys used in the automotive or aerospace industry, such as 2000, 6000, or 7000 series aluminums; 2024, 7075, 6061 are particular examples. Alloys can be unclad or they can contain a clad layer on a surface, the clad layer consisting of a different aluminum alloy than the base/bulk alloy beneath the clad layer.

Nonlimiting examples of substrates include more than one metal or metal alloy in that the substrate can be a combination of two or more metal substrates assembled together such as hot-dipped galvanized steel assembled with aluminum substrates.

Nonlimiting examples of the shape of the metal substrate include in the form of a sheet, plate, bar, rod or any shape desired, but it in many cases it can be in the form of an automobile part, such as a body, door, trunk lid, fender, hood or bumper. The thickness of the substrate can vary as desired.

The coating can be applied directly to the metal substrate when there is no intermediate coating between the substrate and the coating composition. By this is meant that the substrate can be bare, as described below, or can be treated with a pretreatment composition as described below, but the substrate is not coated with any coating compositions such as an electrodepositable composition or a primer composition prior to application of the curable film-forming composition described herein.

As noted above, the substrates to be used can be bare metal substrates, in other words, a virgin metal substrate that has not been treated with any pretreatment compositions such as conventional phosphating baths, heavy metal rinses, etc. Additionally, bare metal substrates that can be used herein can be a cut edge of a substrate that is otherwise treated and/or coated over the rest of its surface. Alternatively, the substrates can undergo treatment steps known in the art prior to the application of the coating composition.

The substrate can be cleaned using conventional cleaning procedures and materials. Nonlimiting examples include mild or strong alkaline cleaners such as are commercially available and conventionally used in metal pretreatment processes. Such cleaners are generally followed and/or preceded by a water rinse. The metal surface can also be rinsed with an aqueous acidic solution after or in place of cleaning with the alkaline cleaner. Nonlimiting examples of rinse solutions include mild or strong acidic cleaners such as the dilute nitric acid solutions commercially available and conventionally used in metal pretreatment processes.

According to the compositions, methods, systems and substrates herein, at least a portion of a cleaned aluminum substrate surface can be deoxidized, mechanically or chemically, in other words removal of the oxide layer found on the surface of the substrate in order to promote uniform deposition of the pretreatment composition (described below), as well as to promote the adhesion of the pretreatment composition coating to the substrate surface. Nonlimiting examples of suitable deoxidizers include a mechanical deoxidizer, which can be uniform roughening of the substrate surface, such as by using a scouring or cleaning pad, nonlimiting examples of which include nitric acid, fluoroboric acid, sulfuric acid, chromic acid, hydrofluoric acid, and ammonium bifluoride, or Amchem 7/17 deoxidizers (available from Henkel Technologies, Madison Heights, Mich.), OAKITE DEOXIDIZER LNC (commercially available from Chemetall), TURCO DEOXIDIZER 6 (commercially available from Henkel), or combinations thereof. Often, the chemical deoxidizer includes a carrier, often an aqueous medium, so that the deoxidizer can be in the form of a solution or dispersion in the carrier, in which case the solution or dispersion can be brought into contact with the substrate by any of a variety of known techniques, such as dipping or immersion, spraying, intermittent spraying, dipping followed by spraying, spraying followed by dipping, brushing, or roll-coating.

The coating compositions described herein can include adhesion promoters. Specific adhesion promotors can be selected for preferred performance with a particular substrate, nonlimiting examples being metal or plastic. In nonlimiting examples, the adhesion promoter includes a free acid, which can include organic and/or inorganic acids that are included as a separate component of the coating compositions as opposed to any acids that can be used to form a polymer that can be present in the coating composition. The free acid can include tannic acid, gallic acid, phosphoric acid, phosphorous acid, citric acid, malonic acid, a derivative thereof, or a mixtures thereof. Suitable derivatives include esters, amides, and/or metal complexes of such acids. Often, the free acid includes a phosphoric acid, such as a 100 percent orthophosphoric acid, superphosphoric acid or the aqueous solutions thereof, such as a 70 to 90 percent phosphoric acid solution. Another nonlimiting example of adhesion promotors that can be used, particularly on plastic substrates, are disclosed in U.S. Patent Application Publication No. 2022/0154007. Nonlimiting examples of other suitable adhesion promoting components include metal phosphates, organophosphates, and organophosphonates and metal phosphates including zinc phosphate, iron phosphate, manganese phosphate, calcium phosphate, magnesium phosphate, cobalt phosphate, zinc-iron phosphate, zinc-manganese phosphate, zinc-calcium phosphate. Other nonlimiting examples of adhesion promoters include phosphatized epoxy resins that can include the reaction product of epoxy-functional materials and phosphorus-containing materials. Additional nonlimiting examples of adhesion promoters include alkoxysilane adhesion promoting agents such as acryloxyalkoxysilanes, such as γ-acryloxypropyltrimethoxysilane and methacrylatoalkoxysilane, γ-methacryloxypropyltrimethoxysilane, γ-glycidoxypropyltrimethoxysilane, γ-methacryloxypropylmethyldimethoxysilane, 3-acryloxypropyltrimethoxysilane, vinyltrimethoxysilane, vinyltriethoxysilane, p-styryltrimethoxysilane, 2-(3,4-epoxycyclohexyl)ethyltrimethoxysilane, γ-glycidoxypropylmethyldimethoxysilane, 3-glycidoxypropylmethyldiethoxysilane, γ-aminopropyltrimethoxysilane, 3-aminopropyltriethoxysilane, N-2(aminoethyl) 3-aminopropylmethyldimethoxysilane, N-2(aminoethyl) 3-aminopropyltrimethoxysilane, N-2(aminoethyl) 3-aminopropyltriethoxysilane, 3-mercaptopropylmethyldimetoxysilane, 3-mercaptopropyltrimethoxysilane and siloxane borates.

As a nonlimiting example, the vehicle substrate can include a component of a vehicle. Suitable vehicles can include a ground vehicle such as, for example animal trailers (e.g., horse trailers), cars, trucks, buses, vans, heavy duty equipment, golf carts, motorcycles, bicycles, trains, railroad cars, and the like. The vehicle can also include watercraft such as, for example, ships, boats, shipping containers, hovercrafts, and the like. The vehicle substrate can include a component of the body of the vehicle, such as an automotive hood, door, trunk, roof, and the like; such as an aircraft or spacecraft wing, fuselage, and the like; such as a watercraft hull, and the like.

As nonlimiting examples, the substrate can include an aerospace substrate (a component of an aerospace vehicle, such as an aircraft such as, for example, airplanes (e.g, private airplanes, and small medium, or large commercial passenger, freight, military airplanes, rockets and other spacecraft), helicopters (e.g., private, commercial, and military helicopters).

The coating composition can be applied over an industrial substrate which can include tools, heavy duty equipment, furniture such as office furniture (e.g., office chairs, desks, filing cabinets, and the like), appliances such as refrigerators, ovens and ranges, dishwashers, microwaves, washing machines, dryers, small appliances (e.g., coffee makers slow cookers, pressure cookers, blenders, etc.), metallic hardware, extruded metal such as extruded aluminum used in window framing, other indoor and outdoor metallic building materials, and the like.

The coating composition can be applied over storage tanks, windmills, nuclear plants, packaging substrates, wood flooring and furniture, apparel, electronics, including housings and circuit boards, glass and transparencies, sports equipment, including golf balls, stadiums, buildings, bridges, and the like, Non-metallic substrates include, but are not limited to polymeric substrates, such as polyester, polyolefin, polyamide, cellulosic, polystyrene, polyacrylic, poly(ethylene naphthalate), polypropylene, polyethylene, nylon, ethylene vinyl alcohol (EVOH), polylactic acid (PLA), other "green" polymeric substrates, poly(ethylene terephthalate) (PET), polycarbonate, polycarbonate acrylobutadiene styrene (PC/ABS), polyamide, and/or plastic composite: substrates such as: glass or carbon fiber composites. The non-metallic substrates can include wood, veneer, wood composite, particle board, medium density fiberboard, cement, stone, glass, paper, cardboard, textiles leather both synthetic and natural, and the like The coating compositions can be applied by any means, such as spraying, electrostatic spraying, dipping, rolling brushing, immersion, spraying, intermittent spraying, dipping followed by spraying, spraying followed by dipping, brushing, roll-coating and the like. The coating composition can also be applied with precision application devices that can apply the coating composition without any overspray. Such devices can therefore apply the coating compositions over a substrate that is not masked with a removable material (such as taping materials for example). The properties of the coating compositions described herein used in combination with the precision application devices can enable the coating composition to be applied over at least a portion of the substrate without overspray.

The application devices that apply coating compositions without overspray can be used to produce a desired pattern and/or design over the substrate. As a nonlimiting example, these application devices can apply coating compositions in a single pass without masking the substrate to produce two or more colors over different portions of the substrate Non-limiting examples of devices that can apply coating compositions without overspray include devices that apply compositions as a continuous jet, as continuous droplets, and/or as a drop on-demand. Specific non-limiting examples of such devices include Piezo actuated valvejets, air actuated valvejets, continuous inkjet printers, gas-ejection droplet generators, vibrating tip droplet generators, piezo-actuated micropneumatic droplet generators, and electrohydrodynamic droplet generators.

The applicator can be a high transfer efficiency applicator that includes a nozzle that includes an opening. The high transfer efficiency applicator can include more than one, or a plurality of nozzles. The nozzle opening can have any suitable shape, nonlimiting examples being circular, elliptical, square and rectangular. The nozzle can include a channel that has the same cross-sectional shape and dimensions of the opening. The nozzle opening can have a diameter of from at least 25 μm, such as at least 50 μm and at least 75 μm and can be up to 300 μm, such as up to 275 μm, up to 250 μm, up to 225 μm and up to 200 μm and can be from 25 μm to 300 μm, such as 25 μm to 250 μm, 25 μm to 200 μm, 50 μm to 300 μm, 50 μm to 250 μm, 50 μm to 200 μm, 75 μm to 300 μm, 75 μm to 250 μm, and 75 μm to 200 μm. The nozzle opening can be any value or range between (and include) any value recited above. Droplets or a stream emitted from the nozzle can have the same diameter as the nozzle opening.

The droplet diameter can be determined using a JetXpert Dropwatcher and its analyze now function in double pulse mode, available from ImageXpert, Inc. Similarly, the nozzle diameter can be determined using the Nozzle Examiner feature of JetXpert.

The coating composition can be provided to the applicator under pressure. In many cases, the plurality of nozzles each include a cylindrical channel having the same diameter as the nozzle opening. The combination of the pressure and channel dimensions results in a shear stress being applied to the coating composition. The shear thinning property of the coating composition as described above allows the coating composition to be expelled from the nozzles at a desired stream flow rate or droplet rate.

The stream flow rate or droplet rate can be from at least 25 cc/min., such as at least 50 cc/min. and at least 75 cc/min. and can be up to 300 cc/min., such as up to 275 cc/min., up to 250 cc/min., up to 225 cc/min. and up to 200 cc/min. and can be from 25 cc/min. to 300 cc/min., such as 50 cc/min. to 300 cc/min., 75 cc/min. to 300 cc/min., 25 cc/min. to 250 cc/min., 50 cc/min. to 250 cc/min., 75 cc/min. to 250 cc/min., 25 cc/min. to 200 cc/min., 50 cc/min. to 200 cc/min. and 75 cc/min. to 200 cc/min. When the flow rate or droplet rate is too low, the coating layer may not have desired properties. If the flow rate or droplet rate is too high, the coating can be prone to puddling and/or sag. The flow rate or droplet rate can be any value or range between (and include) any value recited above.

The coating compositions described herein, when applied according to the methods and systems described herein have a high transfer efficiency, in other words, most, if not all, of the coating composition is applied to the substrate after leaving an applicator and is not wasted and/or over sprayed. The transfer efficiency of the coating composition can be at least 90 wt. %, such as at least 91 wt. %, at least 92 wt. % and at least 93 wt. % and can be up to 100 wt. %, such as up to 99 wt. % and up to 98 wt. % and can be from 90% to 100%, such as from 92% to 100% and 93 to 99%. The transfer efficiency of the coating composition can be any value or range between (and include) any of the values recited above.

The transfer efficiency can be aided by positioning the applicator in close proximity to the substrate. Thus, the distance from the tip of a nozzle in an applicator to the substrate can be from at least 0.5 cm, such as at least 0.6 cm and at least 0.75 cm and can be up to 5 cm, up to 4 cm and up to 3 cm and can be from 0.5 cm to 5 cm, such as 0.5 cm to 4 cm, 0.5 to 3 cm, 0.75 cm to 5 cm, 0.75 cm to 4 cm and 0.75 to 3 cm. The distance from the applicator to the substrate can be any value or range between (and include) any of the values recited above.

The high transfer efficiency of the coating composition and the close proximity of the applicator to the substrate can minimize any evaporation of volatile components from the coating composition while being applied to a substrate. The total solids of the applied coating composition can be within at least 10 wt. %, such as at least 7.5 wt. % and at least 5 wt. % and can be within 1 wt. %, such as within 2 wt. % and within 3 wt. % of the total solids of the coating composition entering the applicator. Often, there is no loss of volatile components and the composition of the applied coating composition is the same as the coating composition entering the applicator. The total solids of the applied coating composition compared to the total solids of the coating composition entering the applicator can be any value or range between (and include) any of the values recited above.

As described above, applicators suitable for use with the methods and systems described herein and useful with the coating composition can include a plurality of nozzles. The number of nozzles on an applicator can be at least one, such as at least 5 and at least 10 and can be up to 3,000, such as up to 2,700, up to 2,250, up to 2,000, up to 1,500, up to 1,000, up to 500, up to 100, up to 75, up to 70 and up to 65 and can be from 5 to 1,000, such as 10 to 500 and 10 to 100. The number of nozzles included in an applicator can be any value or range between (and include) any of the values recited above.

Depending on the number of nozzles included on an applicator, the applicator can have a path width of from at least 0.5 cm, such as at least 1 cm, at least 2.5 cm and at least 5 cm and can be up to 15 cm, such as up to 14 cm, up to 13 cm and up to 12 cm and can be from 1 cm to 15 cm, such as 2.5 cm to 14 cm and 5 to 15 cm. The path width of the coating composition can be any value or range between (and include) any of the values recited above.

Due to the high transfer efficiency, rheological profile of the coating composition, and use of the high efficiency applicators as described herein, there is minimal or no overlap between passes of an applicator within a target area or target deposition path.

Due to the high transfer efficiency, rheological profile of the coating composition, and use of the high efficiency applicators described herein, the applicator is able to traverse the substrate over a target area or target deposition path relatively quickly. Thus, the applicator can have a tip speed of from at least 50 mm/sec., such as at least 100 mm/sec. and at least 200 mm/sec. and can be up to 1000 mm/sec., such as up to 750 mm/sec and up to 500 mm/sec and can be from 50 mm/sec. to 1000 mm/sec., such as 50 mm/sec. to 750 mm/sec., 50 mm/sec. to 500 mm/sec., 100 mm/sec. to 1000 mm/sec., 100 mm/sec. to 750 mm/sec., 100 mm/sec. to 500 mm/sec., 200 mm/sec. to 1000 mm/sec., 200 mm/sec. to 750 mm/sec. and 200 mm/sec. to 500 mm/sec. The tip speed of the applicator can be any value or range between (and include) any of the values recited above.

The coating composition can be applied directly to a substrate and provide a primer coat. Additionally, the coating composition can be applied as a basecoat, and the basecoats can include colorants. Further, the coating composition can be a clearcoat that can cover at least a portion of any of the coatings described herein. The coating compositions described herein can be a final coat, or topcoat, that covers at least a portion of the coatings described herein.

According to the various systems, methods and coating compositions described herein, at least one, or one or more, of the coating layers described above can be included in the coating composition described herein.

Coating layers that do not include the coating compositions described herein ("other coatings"), methods and/or systems described herein, can include various coatings applied by various methods known in the art. As nonlimiting examples, the other coatings can be aqueous based coatings, powder coatings and/or electro coatings known in the art. The other coatings can be applied using conventional, brush, roller, spray and electro coat techniques.

The coating compositions can have no or be substantially free of crosslinking agents. Such coating compositions can be a 1-K or one pack coating composition. Often, the 1-K coating composition is dried after being applied to a substrate.

When the coating composition requires drying after being applied to a substrate, drying can take place under ambient conditions. The coating composition can be dried after being applied to a substrate at a temperature of at least 20° C., such as at least 25° C., at least 30° C. and at least 35° C. and can be up to 140° C., such as up to 120° C., up to 100° C., up to 80° C., up to 70° C. and up to 60° C. and from 20° C. to 140° C., such as 25° C. to 120° C. and 30° C. to 100° C. The coating composition can be dried at any temperature or between (and include) any of the temperatures recited above.

The period of time for drying the coating composition is the designated period of time for removal of volatile components from the coating composition and does not include the time it takes to transfer and subject the coating composition to another step, such as a curing step. The period of time for drying will often depend on the composition of the coating composition and the drying temperatures(s) employed. As a nonlimiting example, the coating composition is flashed for 10 minutes before cure. As a nonlimiting example, a moisture cure for a one pack (1-K) coating composition takes 2 hours to reach dry to touch.

When the coating compositions disclosed herein require curing, the coating compositions can be cured at ambient conditions and can be cured at a temperature of at least 20° C., such as at least 22° C. and at least 25° C. and can be cured at a temperature of up to 270° C., such as up to 260° C., up to 225° C., up to 200° C., up to 175° C., up to 140° C., up to 120° C., up to 100° C., up to 90° C., up to 80° C., and up to 70° C. and from 20° C. to 270° C., such as 22° C. to 270° C. and 25° C. to 270° C., 20° C. to 225° C., 22° C. to 225° C. and 25° C. to 225° C. The cure temperature for the coating compositions can be any value or range between (and include) any of the values recited above. The coating compositions can be cured at the recited temperatures for a period of at least 5 seconds, such as at least 10 seconds, at least 30 seconds, at least 45 seconds, at least 1 minute, at least 2 minutes, at least 3 minutes, at least 4 minutes and at least 5 minutes and can be up to 40 minutes, such as up to 30 minutes, up to 20 minutes and up to 15 minutes and from 5 seconds to 40 minutes, such as 10 seconds to 30 minutes, 1 minute to 20 minutes, 5 minutes to 30 minutes, 1 minute to 20 minutes, and 5 minutes to 20 minutes. The period of time for curing will often depend on the temperature for curing. The period of time for curing the coating composition is the designated period of time for cure and does not include the time it takes to transfer and subject the coating composition to another step. The amount of time required to cure the coating compositions can be any value or range between (and include) any of the values recited above.

After the applied coating composition has been cured and/or dried, it provides a coating layer on a substrate. The thickness of the coating layer, referred to as dry film thickness, can be at least 0.5 μm, such as at least 1 μm, at least 2 μm, at least 5 μm and at least 7 μm and can be up to 65 μm, such as up to 60 μm, up to 55 μm, and up to 52 μm and from 0.5 μm to 60 μm, such as 0.5 μm to 65 μm, such as 0.5 μm to 60 μm, 0.5 μm to 55 μm, 0.5 μm to 52 μm, 1 μm to 65 μm, 1 μm to 60 μm, 1 μm to 55 μm, 5 μm to 65 μm, 5 μm to 60 μm and 5 μm to 55 μm. The dry film thickness of the coating layer can be any value or range between (and include) any of the values recited above.

Dry film thicknesses can be measured using a Fischerscope MMS Permascope according to ASTM D7091-21, "Standard practice for nondestructive measurement of dry film thickness of nonmagnetic coatings applied to ferrous metals and nonmagnetic, nonconductive coatings applied to non-ferrous metals".

The coating compositions described herein provide acceptable to good performance for many other film properties including without limitation adhesion, scratch resistance, abrasion resistance, gloss, DOI, smoothness (Wa, Wb, Wc, Wd, We, longwave, shortwave), humidity resistance, UV resistance, flexibility, stone chip resistance, and color stability.

EXAMPLES

Examples 1-5

Pigmented film-forming compositions were prepared by combining the ingredients in Table 1.

TABLE 1

| Item description | Example 1 (Comparative) Mass (kg) | Example 2 Mass (kg) | Example 3 Mass (kg) | Example 4 Mass (kg) | Example 5 Mass (kg) |
| --- | --- | --- | --- | --- | --- |
| | 100.00 | 100.00 | 100.00 | 100.00 | 100.00 |
| Tint paste | 14.7 | 7.9 | 9.2 | 9.2 | 9.1 |
| DIPA[37] neutralized DDBSA[38] solution (25 wt. %) | 1.84 | 0.98 | 1.15 | 1.15 | 1.14 |
| Aerosil R812 dispersion[1] | 13.14 | 6.97 | 8.22 | 8.18 | 8.14 |
| Bls 292[2] | 0.15 | 0.08 | 0.10 | 0.10 | 0.10 |
| Chiguard 328[3] | 0.75 | 0.40 | 0.47 | 0.47 | 0.46 |
| Eversorb 76[4] | 0.75 | 0.40 | 0.47 | 0.47 | 0.47 |
| Disparlon OX-60[5] | 0.18 | 0.09 | 0.11 | 0.11 | 0.11 |
| BYK-333[6] | | | | | 0.94 |
| Setalux 91767 VX-60[7] | | | 32.22 | 16.03 | 15.96 |
| Setalux 61767 VX-60[7] | | 27.33 | | 16.03 | 15.96 |
| Resimene 757[8] | 24.14 | 25.69 | 15.10 | 15.03 | 14.96 |
| Adhesion promoter[9] | 0.98 | 0.52 | 0.61 | 0.61 | 0.60 |
| Acrylic resin[10] | 4.38 | 2.32 | 2.74 | 2.72 | 2.71 |
| Acrylic microgel[11] | 2.99 | 1.59 | 1.87 | 1.86 | 1.85 |
| Polyester carbamate[12] | 24.7 | 13.1 | 15.5 | 15.4 | 15.3 |
| Silicone DC200 100 centistokes[13] | | 0.80 | 0.95 | 0.47 | |
| Isobutyl alcohol | 1.17 | 0.62 | 0.73 | 0.73 | 0.72 |
| Dpm glycol ether | 0.48 | 0.26 | 0.30 | 0.30 | 0.30 |
| Methyl isobutyl ketone | | 5.82 | 4.30 | 5.22 | 5.20 |
| Methyl amyl ketone | 4.52 | 2.40 | 2.83 | 2.81 | 2.80 |

TABLE 1-continued

| Item description | Example 1 (Comparative) Mass (kg) | Example 2 Mass (kg) | Example 3 Mass (kg) | Example 4 Mass (kg) | Example 5 Mass (kg) |
|---|---|---|---|---|---|
| Aromatic SOLVENT-100 type | 1.18 | 0.63 | 0.74 | 0.74 | 0.73 |
| Ethyl 3-ethoxypropanoate | 3.90 | 2.07 | 2.44 | 2.42 | 2.41 |

[1] Dispersion of Aerosil R-812 silica (Degussa Chemicals) in acrylic polyol as prepared in U.S. Pat. No. 5,959,040 example A at an acrylic to Si ratio of 4.4:1 based on solids.
[2] Hindered amine light stabilizer available from Mayzo Inc.
[3] Benzotriazole UV absorber available from Chitec Technology.
[4] Benzotriazole UV absorber available from Everlight Chemical Taiwan.
[5] Non-ionic defoamer available from Kusumoto Chemicals LTD.
[6] Polyether modified Polysiloxane available from Byk Additives.
[7] SCA in acrylic polyol available from Allnex.
[8] Melamine formaldehyde resin available from Ineos.
[9] Adhesion promoter as prepared in example G of U.S. Pat. No. 7,329,468.
[10] Acrylic resin as prepared in Example A of U.S. Pat. No. 5,646,214
[11] Acrylic Microgel as prepared in example A of U.S. Pat. No. 10,370,555.
[12] Carbamate resin prepared as in example B of U.S. Pat. No. 5,646,214
[13] Polydimethylsiloxane oil available from Dow Corning.
[37] Diisopropanol amine
[38] Dodecyl benzyl sulfonic acid The compositions of examples 1-5 were precision applied to panels coated with Kino 1209, a clearcoat commercially available from PPG Kansai Automotive Finishes (having a surface energy of 27.5 mN/m) using a Durr Ecopaintjet applicator and the application conditions as in Table 2, which also shows some physical properties of the compositions. Viscosities and percent recovery (% recovery) were measured using an Anton Paar MCR 301 rheometer with a Double Gap Cylinder equipped with a DG26.7 measuring system. Surface tension was determined as outlined in German version EN 14370; 2004; 2004-1.

TABLE 2

| | Example 1 (Comparative) | Example 2 | Example 3 | Example 4 | Example 5 |
|---|---|---|---|---|---|
| % Solids at application | 59.96 | 61.44 | 57.77 | 56.87 | 57.07 |
| Low Shear Viscosity (LSV) cps @ 0.1 s$^{-1}$ and 25° C. | 203.9 | 12949 | 5466 | 8444 | 10503 |
| High Shear Viscosity (HSV) cps @ 1000 s$^{-1}$ and 25° C. | 100.2 | 119 | 116 | 114 | 108 |
| % recovery | 74.8 | 86 | 87 | 99 | 80 |
| Surface tension (mN/m) | 32 | 26 | 26 | 26 | 26.5 |
| Flow Rate (cc/min) | 150 | 200 | 200 | 200 | 200 |
| Distance (mm) | 15 | 15 | 15 | 15 | 15 |
| Tip speed (mm/sec) | 600 | 600 | 600 | 600 | 600 |

After a 10 min flash at 23° C., the panels were cured at 140° C. for 30 minutes. The visual testing results are shown in Table 3, where visual rankings are best>better>good>poor.

TABLE 3

| | Example 1 (Comparative) | Example 2 | Example 3 | Example 4 | Example 5 |
|---|---|---|---|---|---|
| Jet stability | Yes | Yes | Yes | Yes | Yes |
| Horizontal Appearance | Best | Good | Better | Better | Better |
| Vertical Sag | Poor | Best | Good | Better | Better |
| Wetting over 27.5 mN/m clearcoat | Poor | Better | Better | Better | Good |
| Dry Film Thickness (um) | 35 | 45 | 45 | 45 | 45 |

Examples 2 through 5 exhibited a better combination of horizontal and vertical appearance compared to Example 1.

Example 6

A coating composition was prepared by combining the components in the amounts identified in Table 4.

TABLE 4

| Item Description | Mass (kg) | Weight % |
|---|---|---|
| methoxy functional polysiloxane resin[14] | 1,866 | 18.28% |
| methyltrimethoxysilane[15] | 698 | 6.83% |
| polydimethylsiloxane anti-foam[16] | 39 | 0.38% |
| APE-based phosphated anionic surfactant[17] | 271 | 2.66% |
| Surface Active Agent[18] | 42 | 0.41% |
| Carbon Black[19] | 197 | 1.93% |
| xylene | 315 | 3.09% |
| silanol-functional silicone resin[20] | 1,418 | 13.89% |
| synthetic amide wax[21] | 422 | 4.14% |
| Dimethyldimethoxy silane[22] | 72 | 0.71% |
| N-octyltriethoxy-silane[23] | 278 | 2.72% |
| 3-Glycidoxypropyl trimethoxysilane[24] | 529 | 5.18% |
| hindered amine[25] | 162 | 1.58% |
| UV absorber[26] | 298 | 2.92% |
| Silane capped acrylic polymer | 3,083 | 30.20% |
| Ethylaminoethanol | 216 | 2.11% |

TABLE 4-continued

| Item Description | Mass (kg) | Weight % |
| --- | --- | --- |
| 3-Aminopropyltriethoxysilane[27] | 288 | 2.82% |
| Antioxidant/Heat Stabilizer[28] | 17 | 0.16% |
| Total | 10,210 | 100% |

[14]DOWSIL ® 3074 commercially available from The Dow Chemical Company.
[15]XIAMETER ® OFS-6070 SILANE commercially available from Dow Corning.
[16]TEGO ® Foamex N commercially available from Evonik.
[17]RHODAFAC ® RE-610E commercially available from Solvay.
[18]BYK-307 commercially available from BYK.
[19]RAVEN ® 14 commercially available from Birla Carbon.
[20]DOWSIL ® RSN-0409 HS commercially available from The Dow Chemical Company.
[21]DISPARLON ® 6900-20X commercially available from Kusumoto Chemicals.
[22]XIAMETER ® OFS-6194 SILANE commercially available from Dow Corning.
[23]XIAMETER ® OFS-6341 SILANE commercially available from Dow Corning.
[24]KBM-403 SILANE commercially available from Shin Etsu.
[25]TINUVIN ® 292 commercially available from BASF.
[26]TINUVIN ® 1130 commercially available from BASF.
[27]KBE-903 SILANE commercially available from Shin Etsu.
[28]NEOSTANN U-220H commercially available from Nitto Kasei Co., Ltd.

The coating composition (75% solids by volume) was applied to a substrate using a Rea Jet DOD 2.0 applicator with 32 nozzles and cured at ambient conditions and was dry to touch after two hours and dried through after 9 hours. Test results and visuals (methods as described above) are shown in Table 5.

TABLE 5

| | |
| --- | --- |
| % solids at application (by volume) | 75 |
| Low Shear Viscosity (cps @ 0.1 s$^{-1}$) and 25° C. | 6179 |
| High Shear Viscosity (cps @ 1000 s$^{-1}$) and 25° C. | 109 |
| % recovery | 88.6 |
| Tip speed (mm/sec) | 500 |
| Print head angle (°) | 15 |
| Target distance (mm) | 5 |
| Horizontal appearance | good |
| Vertical sag | minimal |
| Dry film thickness (μm) | 40 |

Example 7

A 2 k isocyanate formulation was prepared as in Table 6 (amounts in grams) and applied to an ED-6670 panel available from ACT Test Panels LLC using a Durr Ecopaintjet precision 64 nozzle applicator.

TABLE 6

| Item Description | Mass (kg) |
| --- | --- |
| Aerosil R-812 dipersion[1] | 2.47 |
| Benzotriazole[29] | 0.89 |
| TINUVIN 123[30] | 0.59 |
| BYK-390[31] | 0.04 |
| BYK-378[32] | 0.01 |
| Siloxane polyol[33] | 3.06 |
| Setalux 91767 VX-60[7] | 18.47 |
| Setalux 61767 VX-60[7] | 18.47 |
| Dimethyl ethanolamine | 0.05 |
| DIPA37 neutralized DDBSA[38] solution (25 wt. %) | 1.48 |
| Polyol[9] | 1.98 |
| Acrylic polyol[10] | 42.47 |
| Cymel 1156[34] | 4.35 |
| Polyester resin[35] | 2.77 |
| Basonat hi 100[36] | 28.80 |
| Aromatic SOLVENT-100 type | 3.72 |
| Isoamyl acetate | 27.00 |
| N-butyl acetate urethane grade | 6.46 |
| Ethyl 3-ethoxypropanoate (eep) | 2.86 |

TABLE 6-continued

| Item Description | Mass (kg) |
| --- | --- |
| 2-butoxyethyl acetate | 2.47 |
| Diethylene glycol butyl ether acet. | 0.99 |

[29]Tinuvin 928 available from BASF
[30]available from BASF
[31]polyacrylic polymer solution available from BYK Additives and Instruments
[32]polyether modified polydimethylsiloxane available from BYK Additives and Instruments
[33]adhesion promoter as made in example C of U.S. Pat. No. 7,329,468
[34]melamine formaldehyde resin available from Allnex polyester polyol resin as made in Example 3 of U.S. Pat. No. 6,228,953.
[36]polyfunctional isocyanate available from BASF
[37]Diisopropanol amine
[38]Dodecyl benzyl sulfonic acid The properties and application performance are shown in Table 7 using the visuals and methods as described above.

TABLE 7

| | |
| --- | --- |
| % solids at application | 58.4 |
| Low Shear Viscosity (cps @ 0.1 s$^{-1}$) and 25° C. | 5661 |
| High Shear Viscosity (cps @ 1000 s$^{-1}$) and 25° C. | 116 |
| % recovery | 94 |
| Flow rate (cc/min) | 200 |
| Tip speed (mm/sec) | 700 |
| Target distance (mm) | 15 |
| Jet stability | yes |
| Horizontal appearance | good |
| Vertical sag | minimal |
| Dry film thickness (um) | 42 |

Example 8

A pigmented film-forming composition was prepared by combining the ingredients in Table 8 (superscripts as in Table 1).

TABLE 8

| Example 8 | |
| --- | --- |
| Item description | Weight % |
| | 100.00 |
| Tint paste | 8.3 |
| DIPA[37] neutralized DDBSA[38] solution (25 wt. %) | 1.0 |
| Aerosil R812 dispersion[1] | 7.4 |
| Bls 292[2] | 0.1 |
| Chiguard 328[3] | 0.4 |
| Eversorb 76[4] | 0.4 |
| Disparlon OX-60[5] | 0.1 |
| Setalux 91767 VX-60[7] | 14.5 |
| Setalux 61767 VX-60[7] | 14.5 |
| Resimene 757[8] | 13.6 |
| Adhesion promoter[9] | 0.6 |
| Acrylic resin[10] | 2.5 |
| Acrylic microgel[11] | 1.7 |
| Polyester carbamate[12] | 13.9 |
| Silicone DC200 100 centistokes[13] | 0.4 |
| Isobutyl alcohol | 0.7 |
| Dpm glycol ether | 0.3 |
| Methyl isobutyl ketone | 2.5 |
| Methyl amyl ketone | 2.5 |
| Aromatic SOLVENT-100 type | 0.7 |

TABLE 8-continued

Example 8

| Item description | Weight % |
|---|---|
| Ethyl 3-ethoxypropanoate | 2.2 |
| Butyl acetate | 9.5 |

[1]Dispersion of Aerosil R-812 silica (Degussa Chemicals) in acrylic polyol as prepared in U.S. Pat. No. 5,959,040 example A at an acrylic to Si ratio of 4.4:1 based on solids.
[2]Hindered amine light stabilizer available from Mayzo Inc.
[3]Benzotriazole UV absorber available from Chitec Technology.
[4]Benzotriazole UV absorber available from Everlight Chemical Taiwan.
[5]Non-ionic defoamer available from Kusumoto Chemicals LTD.
[7]SCA in acrylic polyol available from Allnex.
[8]Melamine formaldehyde resin available from Ineos.
[9]Adhesion promoter as prepared in example G of U.S. Pat. No. 7,329,468.
[10]Acrylic resin as prepared in Example A of U.S. Pat. No. 5,646,214
[11]Acrylic Microgel as prepared in example A of U.S. Pat. No. 10,370,555.
[12]Carbamate resin prepared as in example B of U.S. Pat. No. 5,646,214
[13]Polydimethylsiloxane oil available from Dow Corning.
[37]Diisopropanol amine
[38]Dodecyl benzyl sulfonic acid The composition of examples 8 and a comparative composition made according to Example 1, Table 1 were precision applied to panels coated with Kino 1209, a clearcoat commercially available from PPG Kansai Automotive Finishes (having a surface energy of 27.5 mN/m) using a Durr Ecopaintjet applicator and the application conditions as in Table 9, which also shows some physical properties of the composition. Viscosities and percent recovery (% recovery) were measured using an Anton Paar MCR 301 rheometer with a Double Gap Cylinder equipped with a DG26.7 measuring system. Surface tension was determined as outlined in German version EN 14370; 2004; 2004-1. Performance attributes (Table 10) are as compared to the comparative composition.

TABLE 9

|  | Example 8 |
|---|---|
| % Solids at application | 51.5 |
| Low Shear Viscosity (LSV) cps @ 0.1 s$^{-1}$ and 25° C. | 5957 |
| High Shear Viscosity (HSV) cps @ 1000 s$^{-1}$ and 25° C. | 69 |
| % recovery | 106 |
| Surface tension (mN/m) | 26 |
| Flow Rate (cc/min) | 220 |
| Distance (mm) | 20 |
| Tip speed (mm/sec) | 700 |

After a 10 min flash at room temperature, the panels were cured at 140° C. for 30 minutes. The visual testing results are shown in Table 10.

TABLE 10

|  | Example 8 |
|---|---|
| Jet stability | Yes |
| Horizontal Appearance | Best |
| Vertical Sag | Better |
| 60° Sag | Good |
| Wetting over 27.5 mN/m clearcoat | Good |
| Dry Film Thickness (um) | 52 |

Whereas particular embodiments of this disclosure have been described above for purposes of illustration, it will be evident to those skilled in the art that numerous variations of the details of the present disclosure can be made without departing from what is defined in the appended claims.

What is claimed is:

1. A coating composition comprising organic solvents:
    wherein the coating composition has a shear thinning rheological profile;
    wherein at shear rates of at least 1000 s-1, the coating composition has a viscosity of 25 cps to 150 cps measured using an Anton Paar MCR 301 rheometer with a Double Gap Cylinder equipped with a DG26.7 measuring system at 25° C.; and
    wherein at shear rates of up to 0.1 s$^{-1}$, the coating composition has a viscosity of 1,000 cps to 30,000 cps measured using an Anton Paar MCR 301 rheometer with a Double Gap Cylinder equipped with a DG26.7 measuring system at 25° C. at 25°; and
    wherein the coating composition comprises a combination of materials comprising insoluble spheroids, low density non-porous particles and insoluble needle or rod-like crystals;
    wherein the insoluble spheroids comprise from 0.1 wt. % to 5 wt. % based on the weight of the coating composition and comprise hypercrosslinked polymer microspheres, highly cross-linked acrylic polymeric particles, and/or crosslinked hydroxyl functional polyacrylic resins;
    wherein the low density non-porous particles comprise from 0.1 wt. % to 5 wt. % based on the weight of the coating composition and comprise fumed silica and/or clays;
    wherein the insoluble needle or rod-like crystals comprise from 0.1 wt. % to 5 wt. % based on the weight of the coating composition and comprise natural gums, calcite, organic transition metal complexes, the reaction product of amines and/or polyamines and polyisocyanates, and/or the reaction product of aromatic amines and polyisocyanates.

2. The coating composition according to claim 1, comprising organic solvents in an amount from 5 wt. % to 90 wt. %, total solids in an amount from 10 wt. % to 95 wt. % based on the weight of the coating composition.

3. The coating composition according to claim 1, wherein a viscosity measured at 0.1 s$^{-1}$ is from 6 to 1,200 times higher than the viscosity of the coating composition measured at 1000 s$^{-1}$, measured using an Anton Paar MCR 301 rheometer with a Double Gap Cylinder equipped with a DG26.7 measuring system at 25° C.

4. The coating composition according to claim 1, wherein the coating composition comprises from 0 to 40 wt. % based on weight of the coating composition of a colorant, and/or from 0.1 wt. % to 25 wt. % based on the weight of the coating composition of a rheological modifier.

5. The coating composition according to claim 1, wherein the primary particle size (Dv 50) of the insoluble needle or rod-like crystals is from 0.1 μm to 15 μm as measured using a Malvern Zetasizer dynamic light scattering instrument.

* * * * *